US006606375B2

(12) United States Patent
Higuchi

(10) Patent No.: US 6,606,375 B2
(45) Date of Patent: *Aug. 12, 2003

(54) DATA COMMUNICATION APPARATUS AND DATA COMMUNICATION METHOD

(75) Inventor: Takafumi Higuchi, Ueda (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/199,125

(22) Filed: Jul. 22, 2002

(65) Prior Publication Data

US 2002/0181679 A1 Dec. 5, 2002

Related U.S. Application Data

(63) Continuation of application No. 09/331,716, filed as application No. PCT/JP98/04978 on Nov. 5, 1998, now Pat. No. 6,449,349.

(30) Foreign Application Priority Data

Nov. 5, 1997 (JP) .............................. 9-318954

(51) Int. Cl.$^7$ ............................................ H04M 11/00
(52) U.S. Cl. .............................. 379/100.17; 379/93.32; 358/436
(58) Field of Search .................. 379/93.31–93.34, 379/100.01, 100.14, 100.17; 375/219–220, 222; 714/704, 706, 746, 748–749; 358/434–436, 438, 440–444, 1.15–1.16; 370/245, 252, 485

(56) References Cited

U.S. PATENT DOCUMENTS

| 4,589,111 A | 5/1986 | Adachi ...................... 714/748 |
| 4,621,366 A | 11/1986 | Cain et al. .................... 375/222 |
| 5,301,035 A | 4/1994 | Hayafune .................... 358/440 |
| 5,303,066 A * | 4/1994 | Kawaguchi ................. 358/434 |
| 5,661,568 A | 8/1997 | Ueno .......................... 358/435 |
| 6,046,825 A | 4/2000 | Yoshida ....................... 358/434 |
| 6,075,620 A | 6/2000 | Yoshida et al. ........... 379/93.31 |
| 6,122,072 A | 9/2000 | Matsui et al. ............... 358/434 |
| 6,324,187 B1 * | 11/2001 | Watanabe et al. ........... 370/522 |
| 6,449,349 B1 * | 9/2002 | Higuchi ................. 379/100.17 |

FOREIGN PATENT DOCUMENTS

| EP | 878950 | 11/1998 | |
| EP | 942586 | 9/1999 | |
| EP | 954157 | 11/1999 | |
| JP | 4-010757 | 1/1992 | |
| JP | 4-35460 | 2/1992 | |
| JP | 8-32789 | 2/1996 | |
| JP | 8-88750 | 4/1996 | |
| JP | 9-214716 | 5/1997 | |
| JP | 9-186838 | 7/1997 | |
| JP | 9-289577 | 11/1997 | |
| JP | 9-312749 | 12/1997 | |
| JP | 10271308 A * | 10/1998 | ............ H04N/1/32 |

OTHER PUBLICATIONS

English Language Abstract of JP 8–88750.
English Language Abstract of JP 8–32789.
English Language Abstract of JP 9–289577.
English Language Abstract of JP 4–35460.

* cited by examiner

Primary Examiner—George Eng
(74) Attorney, Agent, or Firm—Greenblum & Bernstein, P.L.C.

(57) ABSTRACT

A data communication apparatus includes a calling section that performs a communication by sequentially transmitting a calling signal to a destination, and transmitting a shift notification signal that indicates a shift to a short previous-procedure. A memory stores destination information and modem control information in association with each other. When the destination to which the communication is performed corresponds to the destination information stored in the memory, the calling section transmits the shift notification signal, and controls a modem based on the stored modem control information so as to shorten a previous-procedure.

8 Claims, 19 Drawing Sheets

| PROBING TONE ||
|---|---|
| FREQUENCY(HZ) | PHASE(DEGREE) |
| 150 | 0 |
| 300 | 180 |
| 450 | 0 |
| 600 | 0 |
| 750 | 0 |
| 1050 | 0 |
| 1350 | 0 |
| 1500 | 0 |
| 1650 | 180 |
| 1950 | 0 |
| 2100 | 0 |
| 2250 | 180 |
| 2550 | 0 |
| 2700 | 180 |
| 2850 | 0 |
| 3000 | 180 |
| 3150 | 180 |
| 3300 | 180 |
| 3450 | 180 |
| 3600 | 0 |
| 3750 | 0 |

FIG.4

DATA COMMUNICATION APPARATUS AND
DATA COMMUNICATION METHOD

This application is a Continuation of U.S. application Ser. No. 09/331,716, filed on Jun. 25, 1999, U.S. Pat. No. 6,449,349 which was the National State of International Application No. PCT/JP98/04978, filed on Nov. 5, 1998, the contents of which are expressly incorporated by reference herein in their entireties. The International Application was not published under PCT Article 21(2) in English.

TECHNICAL FIELD

The present invention relates to a data communication apparatus and a data communication method, which shortens the time needed for a previous-procedure to be performed prior to data communication using a modem, such as facsimile communication.

BACKGROUND ART

Recently, in data communication apparatus, data communication using a V.34 modem (33.6 kbps), which is conformed to recommends of the ITU-T. The ITU-T also recommends T30 ANEXF (so-called Super G3) as facsimile communication standards using the V.34 modem for facsimile apparatuses. A previous-procedure for facsimile communication is carried out according to the standards procedure, after which communication of image data is executed.

Such a communication protocol will be explained based on the sequence chart illustrated in FIG. 1. FIG. 1 is a control signal view for a communication protocol for facsimile communication according to prior art.

Referring to FIG. 1, reference character 19a denotes a communication procedure for selecting a modulation mode from among a V34 half-duplex, V34 full duplex, V17 half-duplex, etc. Reference character 19b denotes a communication procedure for line probing to check a line and determine various kinds of parameters. Reference character 19c denotes a communication procedure for modem training. Reference character 19d denotes a communication procedure for setting a modem parameter. Reference character 19e denotes a communication procedure for exchanging a facsimile control signal. And, reference character 19f denotes a data communication procedure for the primary channel. The upper side in the diagram is a sequence for a caller modem, and the lower side is a sequence on an answer modem, and the sequences progress from left to right.

The above communication protocols will be specifically described as follows:

First, in the communication procedure 19a for selecting a modulation mode, the selection of a modulation mode and communication procedure, which permit communication between a caller modem and an answer modem, through a V.21 modem (300 bps, full-duplex), is carried out after a line connection is established. A facsimile apparatus using a V.34 modem selects a V.34 modem as the modulation mode and facsimile communication as a communication procedure.

After that, in the communication procedure 19b for line probing, the caller modem transmits a line probing tone. The line probing tone is received by the answer modem, a line inspection is carried out, and a training parameter is selected based on the result of the line inspection.

In the communication procedure 19c for modem training, the caller modem sends training signals based on the training parameter selected under the line probing communication procedure 19b, while the answer modem receives the training signals, learns a filter coefficient for an adaptive equalizer for compensating the line characteristic and checks the reception quality of the training signals.

In the communication procedure 19d for selecting a modem parameter, modem parameters are negotiated between the caller modem and the answer modem in full-duplex communication at 1200 bps. As a result, an optimal modem parameter is selected from the modem parameters preset in the apparatus, the result of the line inspection and the inspection of the reception quality of the training signals.

In the communication procedure 19e for a facsimile control signal, negotiation of facsimile control signals NSF, CSI, DIS, TSI, DCS, CFR, etc. is executed in full duplex communication at 1200 bps.

Then, in the data communication procedure 19f, image data is transmitted from the caller modem in half-duplex communication at 2400 bps to 33.6 kbps. Image data is received by the answer modem. In the case of performing communication at the maximum communication rate of 33.6 kbps, image data can transmit in approximately three seconds per a sheet of paper of size A4.

The caller and answer modes, which execute the aforementioned communication protocol, carry out communication in accordance with the training parameter selected under the communication procedure 19b for communication line probing and the modem parameter selected under the communication procedure 19d for selection of a modem parameter. To compensate the line characteristic, the receiver modem executes communication using the filter coefficient that has learned in the modem training 19b. This ensures optimal data communication according to the line quality.

However, the above-described prior art structure involves five channels of a procedure before starting sending image data after line establishment, and thus requires about 7 seconds. By contrast, since electric transmission of a single sheet of image data at the maximum communication rate of 33.6 kbps takes about 3 seconds, the procedures requires over 60% of the entire time of 11 seconds required for transmission of one sheet of an original including the later-procedure about 1 second. This time needed for the previous-procedure gets greater as the number of transmission/reception lines increases, and generates wasteful time and communication cost.

DISCLOSURE OF INVENTION

In consideration of the above-mentioned problems, an object of the present invention is to provide a data communication apparatus which can shorten time for setting various kinds of parameters of a modem and time for a previous-procedure including time for modem training before the image transmission.

Also, an object of the present invention is to provide a data communication apparatus such that a supported short previous-procedure function appropriately operates even when a communication error rate is high or line characteristics are changed.

More specifically, there is provided a data communication apparatus comprising:

storing means for storing various kinds of modem control information for each destination in association with an operation key;

calling means for generating a call to said destination by a transmission command from said operation key to start communication; and communication control means for transmitting a shift notify signal indicative of the shift to a previous-procedure for short communication in a case of communication using said calling means, thereafter controlling the modem based on said various kinds of control information so as to shorten a previous-procedure and carry out data transmission.

The data communication apparatus according to the first aspect of the present invention comprise storing means for storing various kinds of modem control information for each destination in associate with an operation key, calling means for generating a call to said destination by a transmission command from said operation key to start communication; and communication control means for transmitting a shift notify signal indicative of a shift to a short previous-procedure in a case of communication using said calling means, thereafter controlling the modem based on said various kinds of control information so as to shorten a previous-procedure and carry out data transmission.

According to the above-mentioned structure, communication to the destination registered in the operation key is executed in the short previous-procedure based on control information stored in storing means, so that an operator can shorten communication time by considerably simple operation. Since it is unnecessary to obtain modem control information suitable for the destination by communication in the previous-procedure, time required for a previous-procedure can be greatly shortened. Control information described here is time for modem parameter or modem training.

The second aspect of the present invention, in the data communication apparatus of the first aspect, the communication control means transmits the shift notification signal that indicates shift to a short previous-procedure in place of a calling menu signal, in response to a deformed answer signal from an answer side apparatus with respect to a calling signal transmitted in previous-procedure configured to conform to Recommendation ITU/V.34 dated September 1994.

According to the above-described structure, the apparatus in answer side receives either the calling menu signal in V.34 protocol or the shift notify signal indicating shift to the short previous-procedure. Since the apparatus has only to identify these signals, the apparatus can receive the shift notify signal to the short previous-procedure without requiring a greatly change in a receiving signal processing circuit.

The third aspect of the present invention, in the data communication apparatus of the first or second aspect, the communication control means confirms whether or not various kinds of the modem control information are stored in said storing means prior to the shift to the short previous-procedure, and executes the short previous-procedure only when said control information is stored.

According to the above-mentioned structure, control of communication control means can be simply carried out. Namely, communication control means check a writing state of storing means, and select whether or not control information is written to storing means, so that communication control means may change the ON/OFF state of short previous-procedure, easily.

The forth aspect of the present invention, in the data communication apparatus of the first or second aspect, the data communication apparatus farther comprises parameter registering means for storing various kinds of the modem control information obtained in the previous-procedure executed with respect to the destination registered in said storing means in a state that only destination information corresponding to said operation key is stored in said storing means.

According to the above-described structure, if the destination information has only to be registered correspond to the operation key, control information actually obtained in communication with the destination in the normal previous-procedure is automatically stored, and subsequent communication can be automatically executed in the short previous-procedure. Therefore, this gives a good operability to the operator.

Destination information described here is one that specifies the destination such as a destination's name, a telephone number, ID information.

The fifth aspect of the present invention, the data communication apparatus of the forth aspect, the apparatus further comprises error detecting means for detecting an error of communication, and the parameter registering means does not execute the registration of control information when error detecting means detects an error in the previous-procedure for registering the parameter for short previous-procedure.

The above-described parameter registering means in the fifth aspect automatically registers various kinds of the modem control information obtained in the previous-procedure. However, if control information in the previous-procedure where a error has been occurred is registered, there is a high possibility that an error will occur again. For this reason, registration of control information is not carried out. Since the short previous-procedure is not executed in next communication, there can be avoided a case in which communication time is increased due to the short previous-procedure execution error.

The six aspect of the present invention, in the data communication apparatus of the fifth aspect, the parameter registering means executes once stores control information obtained in the normal previous-procedure in said storing means, after which said control information is erased, thereby executing processing in which no registration of control information is carried out.

According to the above-mentioned structure, since processing for prohibiting registration of parameter (control information) to be carried out first and processing for erasing control information registered in storing means can be executed in the same processing flow, simplification of processing and software can be improved.

The seven aspect of the present invention, the data communication apparatus of one to six aspect, when the short previous-procedure proceeds abnormally, said communication control means performs a shift to communication by the normal previous-procedure or second communication procedure having low communication speed so as to continue communication after a lapse of a predetermined period of time.

According to the above-mentioned structure, when the short previous-procedure does not normally proceed within a predetermined period of time, communication in the other communication procedure whose communication speed is low is continued. For this reason, there can be avoided a case in which a communication error occurs by failure in the short procedure. In this case, the communication protocol to be shifted may be a communication protocol whose communication speed is the same as that of the short previous-procedure execution time or a communication protocol whose communication speed is lower than that of the short previous-procedure execution time.

According to the eighth aspect of the present invention, in the data communication apparatus of the seventh aspect, the second communication procedure is a communication protocol according to Recommendation ITU/T.30, dated 1976 and the predetermined period is time for which NSF/CSI/DIS signals of T.30 can be received twice or more after shift to the second communication procedure.

According to the above-mentioned structure, in the case of failure in the short previous-procedure, shift to T.30 communication procedure is carried out, and a standby state for a control signal of 300 bps is set. NSF/CSI/DIS signals are repeatedly transmitted. For this reason, even if first reception of a control signal ends in failure, at least two signal reception times can be ensured not to generate a communication error. Therefore, even if the apparatus on the destination is changed to one, which is not equipped with the short previous-procedure, or the short previous-procedure ends in failure, shift to T.30 protocol can be surely executed.

The nine aspect of the present invention, the data communication apparatus of the one to six aspect, when the short previous-procedure does not proceeds normally, the communication control means change the procedure from the short previous-procedure to a second communication procedure having low communication speed so as to continue communication after the number of retrial times of said short previous-procedure reaches a fixed value.

Although the shift to the second communication procedure was executed after a lapses of a predetermined period of time in the seven aspect, the shift to the second communication procedure is executed by the number of retrials of the short previous-procedure in the nine aspect.

The ten aspect of the present invention, in the data communication apparatus of the one to fourth aspect, the apparatus further comprises error detecting means for detecting an error of communication, wherein when said error detecting means detects an error after starting execution of the short previous-procedure, said communication control means maintains destination information stored in said storing means on one hand and erases only the corresponding various kinds of control information in said storing means on the other hand.

In other words, if some error occurs after the start of executing the short previous-procedure and control information used at this time is used in the future, there is a high-possibility that an error will occur again. For this reason, such information is erased. Such communication error occurring after the start of executing the short previous-procedure can be applied to both a case in which the previous-procedure is executing and a case in which data communication is executing after the previous-procedure is accomplished. However, treatment of control information thereafter differs, depending on whether or not the short previous-procedure is ended.

The eleven aspect of the present invention, in the data communication apparatus of the seven aspect, the apparatus further comprises parameter registering means for executing a normal previous-procedure in the same call so as to newly store various kinds of the modem control information obtained in the executed normal previous-procedure in said storing means when the short previous-procedure does not proceeds normally.

According to the above-mentioned structure, control information stored in storing means is automatically updated in the same call. Therefore, next communication is started in the short previous-procedure. There is a case in which an error occurs again based on updated control information. However, if such occurrence of error is repeated, the execution of the short previous-procedure itself is prohibited as described later.

The twelve aspect of the present invention, in the data communication apparatus of the ten aspect, the error detecting means determines an error of communication when a data transmission error rate of communication obtained after executing the short previous-procedure or the normal communication previous-procedure increases to a predetermined value or more.

According to the above-described structure, for example, when the error gradually increases during communication, control information registered in storing means is determined as an unsuitable parameter. This is particularly useful for a case in which line characteristic is better than a normal case at a parameter registration time.

The thirteen aspect of the present invention, in, the data communication apparatus of the ten aspect, the error detecting means determines an error of communication when a data transmission error rate of communication obtained after executing the short previous-procedure or the normal previous-procedure is lower than a data transmission error rate of a communication protocol whose speed is slower than communication speed.

According to the above-described structure, there can be avoided a disadvantage in which communication is repeated at communication speed which is lower than the normal communication speed. In contrast to the previous case, this is particularly useful for a case in which line characteristic is worse than a normal case at a parameter registration time.

The fourteen aspect of the present invention, in the data communication apparatus of the twelve aspect or thirteen aspect, the apparatus further comprises parameter registering means for storing various kinds of the modem control information obtained in a next normal previous-procedure executed with respect to the destination in said storing means after erasing control information from said storing means.

According to the above-mentioned structure, next communication is executed in the normal previous-procedure. At this time, registration of modem control information is automatically performed, and next communication is automatically executed in the short previous-procedure.

The fifteen aspect of the present invention,-in the data communication apparatus of the first to fourth aspect, when the number of error generations of the short previous-procedure or an error rate to the number of short previous-procedure executions exceeds a predetermined value, the short previous-procedure with respect to the destination in subsequent communication is prohibited from being executed.

According to the above-mentioned structure, there can be avoided a case in which the short previous-procedure is executed in accordance with control information having a high error rate to generate an error repeatedly. The error rate may be calculated at the time when the short previous-procedure execution time reaches a predetermined value, or the number of errors may be simply counted. When the error rate is high, the execution of the short previous-procedure is prohibited at the earliest time, so that the number of times of executing waste short previous-procedure can be reduced.

To count the number of errors, as described in aspect sixteen, the apparatus comprises an error counter for counting a number of error generations of short previous-procedure, wherein said error counter counts up every time when various kinds of control information stored in said storing means are erased.

The seventeen aspect of the present invention, in the data communication apparatus of the sixteen aspect, the error counter determines whether or not communication is one that is started in the short previous-procedure before counting up, and the error counter executes no counting operation when a result of said determination is no.

According to the above-mentioned structure, the error counter can surely perform the counting operation. Particularly, in a case where control information is erased from storing means in the normal communication protocol as described in aspect ten, the counting operation of the error counter is prohibited, so that no error occurs in the count value.

The eighteen aspect of the present invention, in the data communication apparatus of the fifteen aspect, the communication control means confirms whether or not various kinds of the modem control information are registrable in said storing means prior to the shift to the short previous-procedure, and executes no short previous-procedure when various kinds of the modem control information are non-registrable.

According to the above-described structure, when the error often occurs in the short previous-procedure, registration of control information to storing means is prohibited so that the execution of the short previous-procedure itself is prevented. At this time, if registration of control information to storing means is prohibited, the modem parameter is stored, after which communication in the normal communication protocol is started. Therefore, a waste short previous-procedure in which the error occurs again is not executed.

The nineteen aspect of the present invention, in the data communication apparatus of the eighteen aspect, the apparatus further comprises parameter registering means for storing various kinds of the modem control information obtained in the normal previous-procedure, wherein prohibition of executing the short previous-procedure is carried out by prohibiting said various kinds of the modem control information from being written to said parameter registering means.

According to the above-mentioned structure, for example, the prohibition of various kinds of modem control information to storing means by parameter registration means based on software, thereby making it possible to prohibit the short previous-procedure from being executed easily.

The twenty aspect of the present invention, in the data communication apparatus of the first to fourth aspect, the apparatus further comprises operating means for changing a destination's name stored in said storing means or a destination's telephone number; and memory controlling means for automatically erasing all information of a relevant information storing area including modem control information stored in association with said destination's telephone number when there is a change in said destination's telephone number input by said operating means.

According to the above-mentioned structure, the parameter can be registered in association with a new destination's telephone number. When the telephone number is changed, the line characteristic is also changed in many cases. However, control information can be erased and updated in a state that the operator has no awareness thereof. Control information to be erased here includes short previous-procedure registration prohibition information, that is, all information stored in association with the destination's telephone number.

The twenty-one aspect of the present invention, in the data communication apparatus of the first to fourth aspect, the apparatus further comprises operating means for inputting an identification code peculiar to a self-apparatus; and memory controlling means for automatically erasing all information of a relevant information storing area including modem control information stored in association with all telephone numbers destination-registered when there is a change in said identification code input by said operating means.

According to the above-mentioned structure, when the telephone number of the self-apparatus is changed, all information including control information and short previous-procedure registration prohibition information can be automatically erased without executing the operation by the operator.

The twenty-two aspect of the present invention, the apparatus further comprises parameter registering means for storing various kinds of the modem control information obtained in a next normal previous-procedure executed with respect to a destination in said storing means in a state that only the destination corresponding to an operation key is stored in storing means. Thereby, the automatic registration of parameter can be executed with respect to storing means in which control information has been automatically erased in next communication.

The twenty-three aspect of the present invention, the apparatus further comprises memory control means for automatically erasing all information of a relevant information storing area including modem control information stored in association with all telephone numbers destination-registered when an error continuously occurs in the short previous-procedure executed with respect to a plurality of destinations.

According to the above-mentioned structure, on the presumption that the reason why a continuous error occurs in the short previous-procedure lies in a change in the kind of line to which the self-apparatus is connected, the execution of the short previous-procedure can be prohibited. Therefore, in subsequent communication, the normal communication is sequentially executed, and new control information can be registered.

The twenty-four aspect of the present invention, in the data communication apparatus of the first to fourth aspect, said control information is deleted from said storing means after a lapse of a predetermined period of time from registration of control information to said storing means so as to execute an update of control information by parameter registering means.

According to the above-mentioned structure, modem control information to be registered in memory means can be maintained to an optimal state.

The twenty-five aspect of the present invention, in the data communication apparatus of the first to twenty-four aspect, the apparatus further comprises memory control means for rewriting the modem control information registered in said storing means, wherein every time when a normal previous-procedure is executed to acquire modem control information, said memory control means adds modem control information newly acquired, corrects the modem control information registered in said storing means so as to be recorded again.

According to the above-mentioned structure, since the parameter is corrected and learned for each communication so as to be maintained to be an optimal value, suitable communication having short communication time, high communication speed, and a low error rate can be carried out while using the short previous-procedure.

The twenty-six aspect of the present invention, in the data communication apparatus of the first to twenty-four aspect, suitable modem control information is calculated based on a plurality of modem control information obtained by repeating execution of a normal previous-procedure a plurality of times, and said calculated control information is registered in said storing means.

According to the above-mentioned structure, since initial registration of modem control information to be registered in storing means can be adjusted and registered, a probability of success of the short previous-procedure can be improved.

BRIEF DESCRIPTION OF DRAWINGS

FIG. 4 is an explanatory diagram showing tones of a line probing tone signal of the data communication apparatus according to the first embodiment;

BEST MODE FOR CARRYING OUT THE INVENTION

First Embodiment

Figure 2:
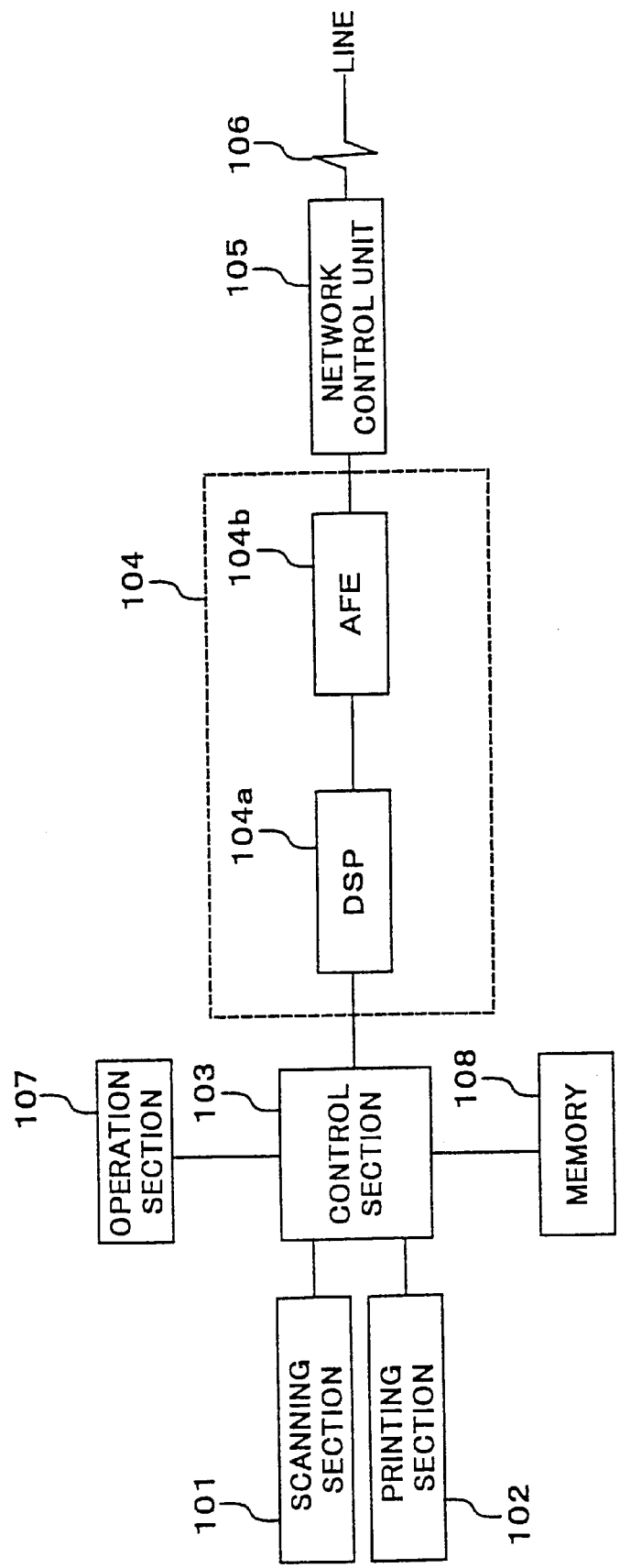
FIG. 2 is a basic structural block diagram of a facsimile apparatus to which a data communication apparatus according to a first embodiment of the present invention is applied.

A data communication apparatus according to a first embodiment of the present invention will be specifically described with reference to the accompanying drawings. FIG. 2 is a basic block diagram of a facsimile apparatus to which the present invention is applied.

Referring to FIG. 2, reference character 101 is a scanning section for scanning an original image. A printing section 102 records and outputs the received image. A control section 103 performs the control of the entire apparatus and carries out control to encode and decode image signals and execute a communication protocol.

A modem 104 implements every modulation and demodulation in a facsimile communication protocol that is specified in T.30 ANNEX F of the ITU-T dated June 1996. The modem 104 comprises a digital signal processor (DSP) 104a for performing modem's signal processing and an analog front end section 104b serving as both A/D conversion and D/A conversion functions.

A network control unit (NCU) 105 controls dialing and calling to a line 106. An operation section 107 comprises various kinds of key input switches, such as dial keys and a start key, and a display unit for displaying information. Various kinds of operations of the apparatus are performed through this operation section 107.

Figure 8:
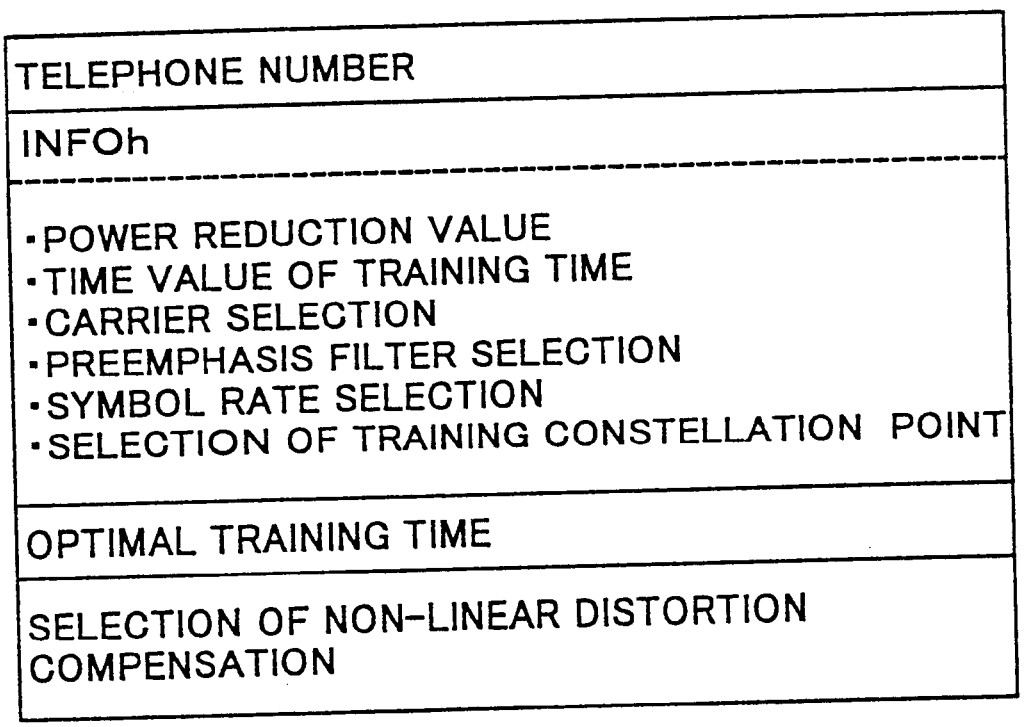
FIG. 8 is a memory structural diagram of a short previous-procedure registration memory of the data communication apparatus according to the first embodiment.

A memory 108 stores various kinds of information for execution of a short previous-procedure in the case of communicating with a communication destination, which has a short previous-procedure function. In this embodiment, information like a telephone number and a modem parameter is stored in the memory 108 as shown in FIG. 8 to be described later.

A modem parameter includes a power reduction value indicative of signal power and a time data indicative of a training time, and performs various selections, such as carrier frequency selection for selectively setting either a high level or a low level, preemphasis filter selection, symbol rate selection for selectively setting five levels of rates that are transmitted for an eye pattern and selection of a training constellation point.

Figure 3:
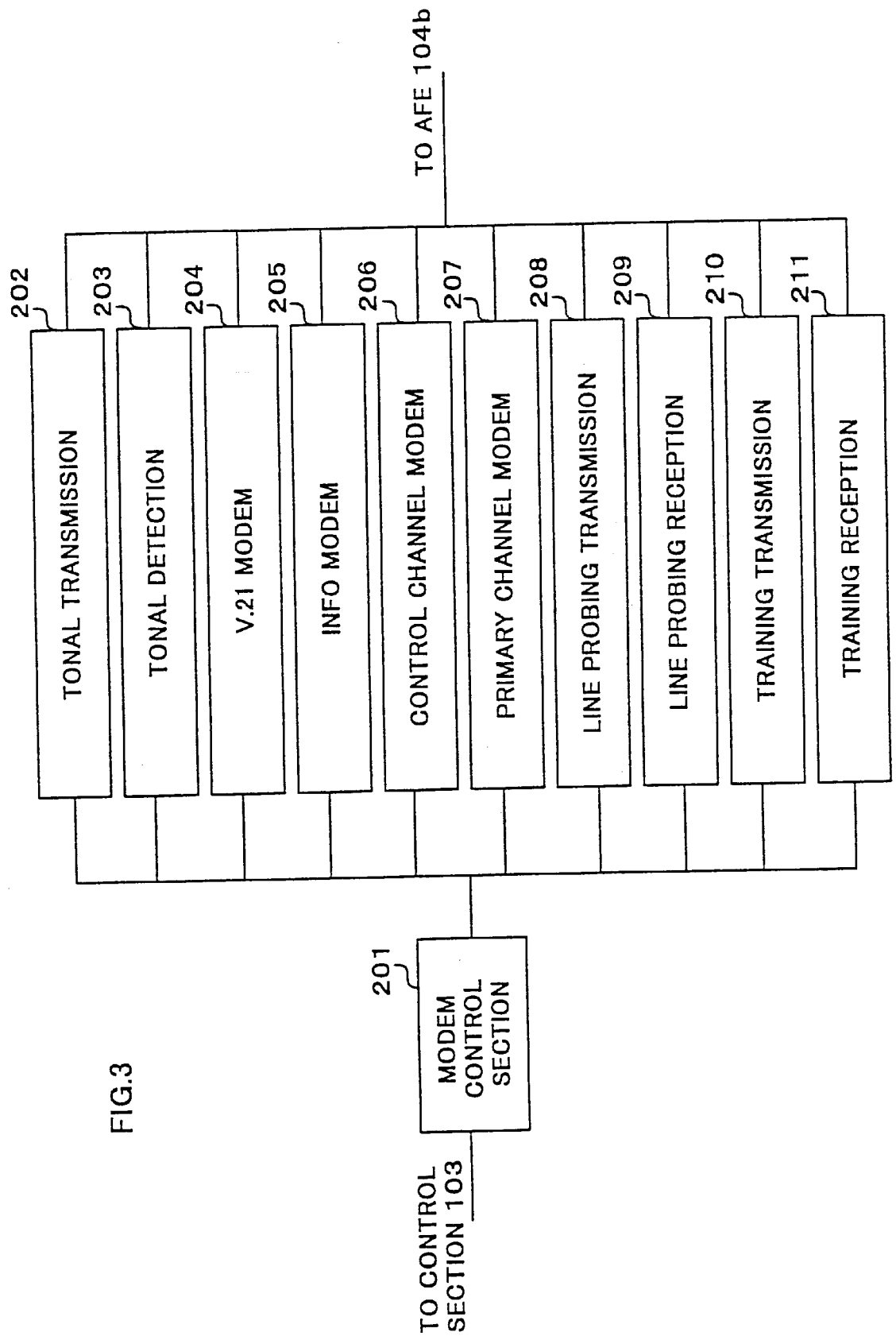
FIG. 3 is a structural view showing a function of a digital signal processor of the data communication apparatus according to the first embodiment.

The functional structure of the digital signal processor 104a of the modem 104 is explained with reference to FIG. 3.

A modem control section 201 controls interface with the control section 103 and the modem 104 and various modem functions. The modem control section 201 comprises a plurality of functional sections to be explained below, and these functions are executed by normal software.

A tonal transmission functional section 202 transmits various tonal signals in accordance with communication protocols. A tonal detecting section 203 identifies a tonal signal sent from a communication destination.

A V.21 modem 204 is a modem that is in conformance with Recommendation V.21 of the ITU-T (300 bps, full-duplex). An INFO modem 205 is a modem that is in conformance with Recommendation V.34 dated September 1994 of the ITU-T (600 bps, full-duplex), and which is used in a start procedure in the communication protocol for line probing and a short previous-procedure.

A control channel modem functional section 206 is a modem that is specified by Recommendation V.34 of the ITU-T (1200 bps or 2400 bps, full-duplex), and is used in setting a modem parameter for a primary channel modem and in a communication protocol for a facsimile control signal.

A primary channel modem functional section 207 is a main channel modem, that is specified by Recommendation V.34 of the ITU-T (2400 bps to 33.6 kbps, half-duplex), and is used in communicating image data.

A line probing transmission functional section 208 transmits line probing tones, which are specified by Recommendation V.34. The line probing tone are combined signals of 21 kinds of tonal signals of 150 Hz to 3750 Hz as shown in FIG. 4.

A line probing reception functional section 209 receives the line probing tones from a communication destination and carries out a line inspection. More specifically, the line probing reception module functional section 209 performs spectrum analysis on the received signals using the fast Fourier transform algorithm to select the optimal symbol rate and carrier frequency for the primary channel modem 207 and other modem parameters.

A training transmission functional section 210 transmits training signals for the V.34 modem. A training reception functional section 211 receives the training signals from a communication destination and learns a filter coefficient of an adaptive equalizer to compensate line distortion.

Figure 5:
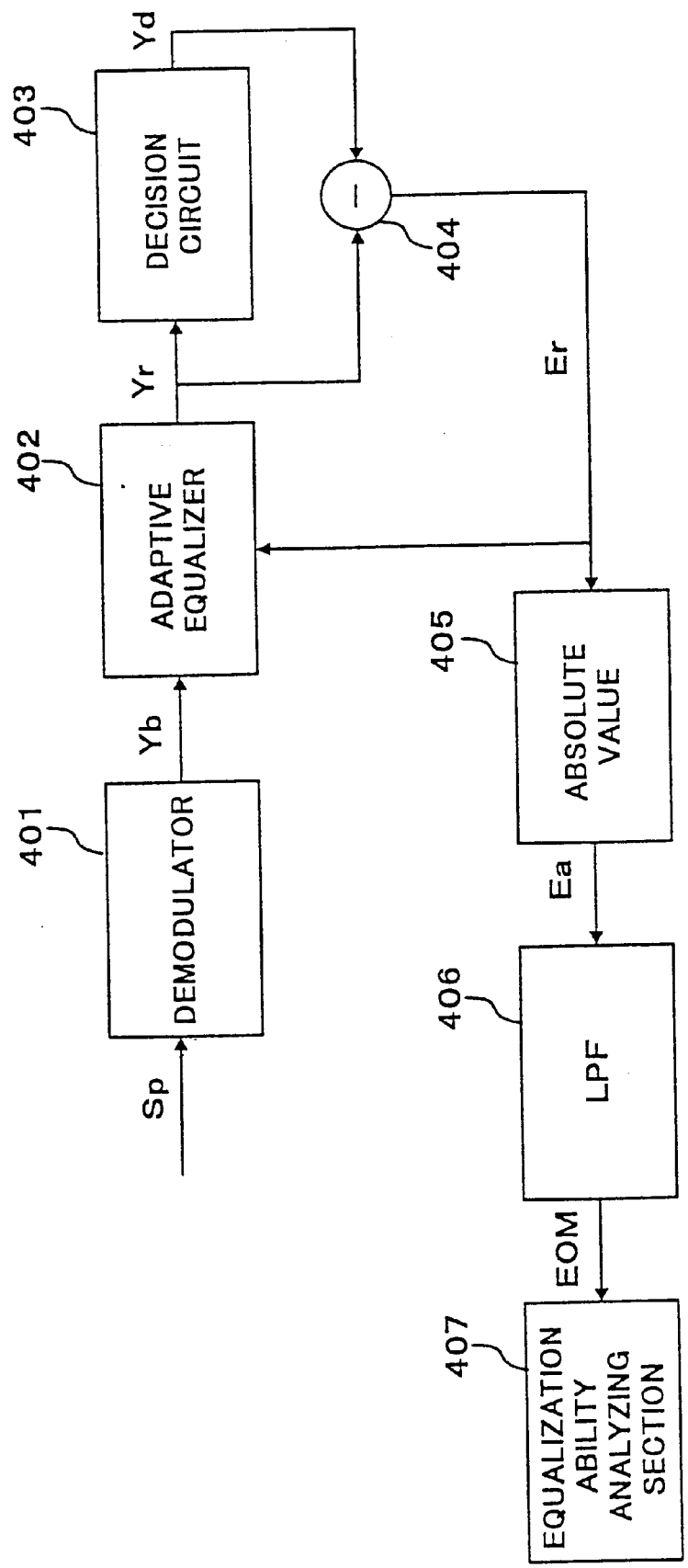
FIG. 5 is a block diagram of a training reception section of the data communication apparatus according to the first embodiment.

Next, the training signal reception functional section 211 will be discussed with reference to the block diagram of FIG. 5.

A demodulator 401 converts a received training signal Sp, which has undergone A/D conversion in the analog front end section 104b, to a complex baseband signal Yb from the passband. An adaptive equalizer 402 compensates line distortion with respect to the baseband signal Yb and outputs a received signal Yr. A decision circuit 403 determines a decision point Yd and outputs it. The, decision point Yd is used to determine the amount of shift of a point on an eye pattern of a received signal Yr. A subtracter 404 subtracts the decision point Yd from the received signal Yr and outputs an error signal Er. Note that Yb, Yr, Yd and Er are complex signals. The error signal Er is supplied to the adaptive equalizer 402. The adaptive equalizer 402 learns such an internal filter coefficient as to reduce this error signal Er. The learned internal filter coefficient is used as a reception filter coefficient in the primary channel modem 207.

An absolute value unit 405 computes an absolute value with respect to the error signal Er.

An LPF 406 is a low-pass for smoothing the output signal Ea of the absolute value unit 405. The output signal of the LPF 406 is an EQM signal, which represents the degree of compensation for the line distortion of the adaptive equalizer 402. The smaller this EQM signal is, the more sufficiently the line distortion is compensated.

Figure 6:
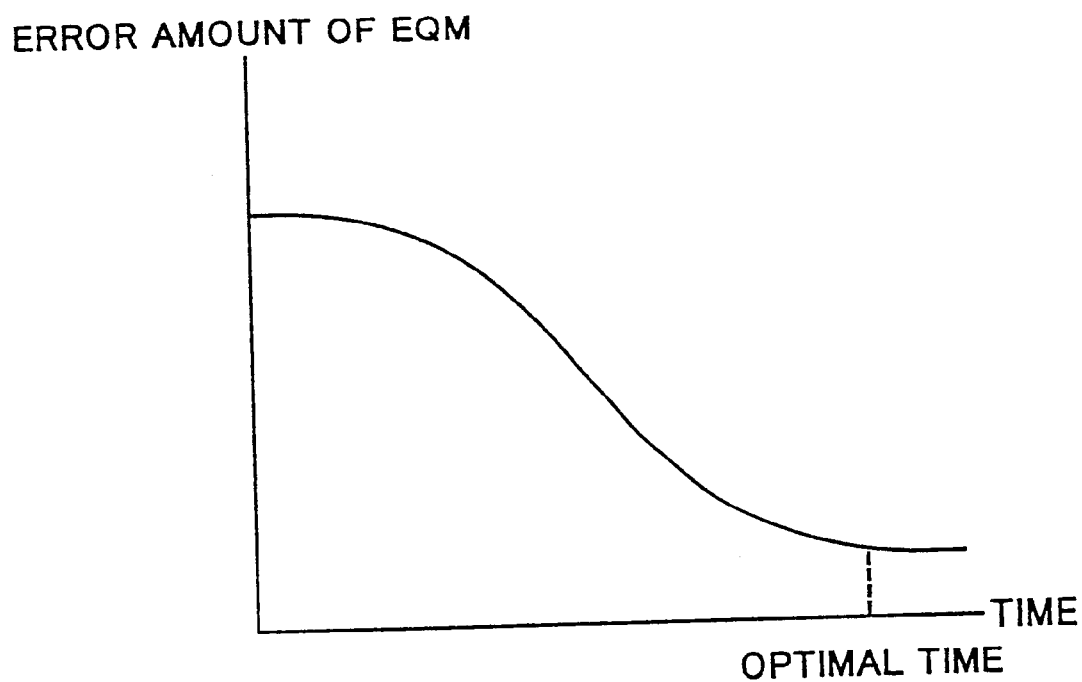
FIG. 6 is an explanatory diagram illustrating calculation of an optimal training time of the data communication apparatus according to the first embodiment.

An equalization ability analyzing section 407 analyzes the ability of the adaptive equalizer 402 to compensate the line distortion from the EQM signal. The equalization ability analyzing section 407 observes the amount of change in the EQM signal from the beginning of training as shown in FIG. 6, and computes the time, at which the absolute value of the amount of change becomes smaller than a given value, as the optimal training time. Also, the equalization analyzing module 407 also computes the ratio (SN) of the training signal power to noise power as a final value of the EQM signal. The optimal training time is an absolute value from the origin of the point in the eye pattern. The noise power is an error in the point in the eye pattern.

The optimal training time is used as the training time in executing a short previous-procedure. On the other hand, the SN ratio is used in selecting the data transfer rate of the primary channel modem 207. Note that no computation of the optimal training time is executed when a short previous-procedure is carried out.

The operation of the above-structured data communication apparatus will be discussed below.

Figure 7:
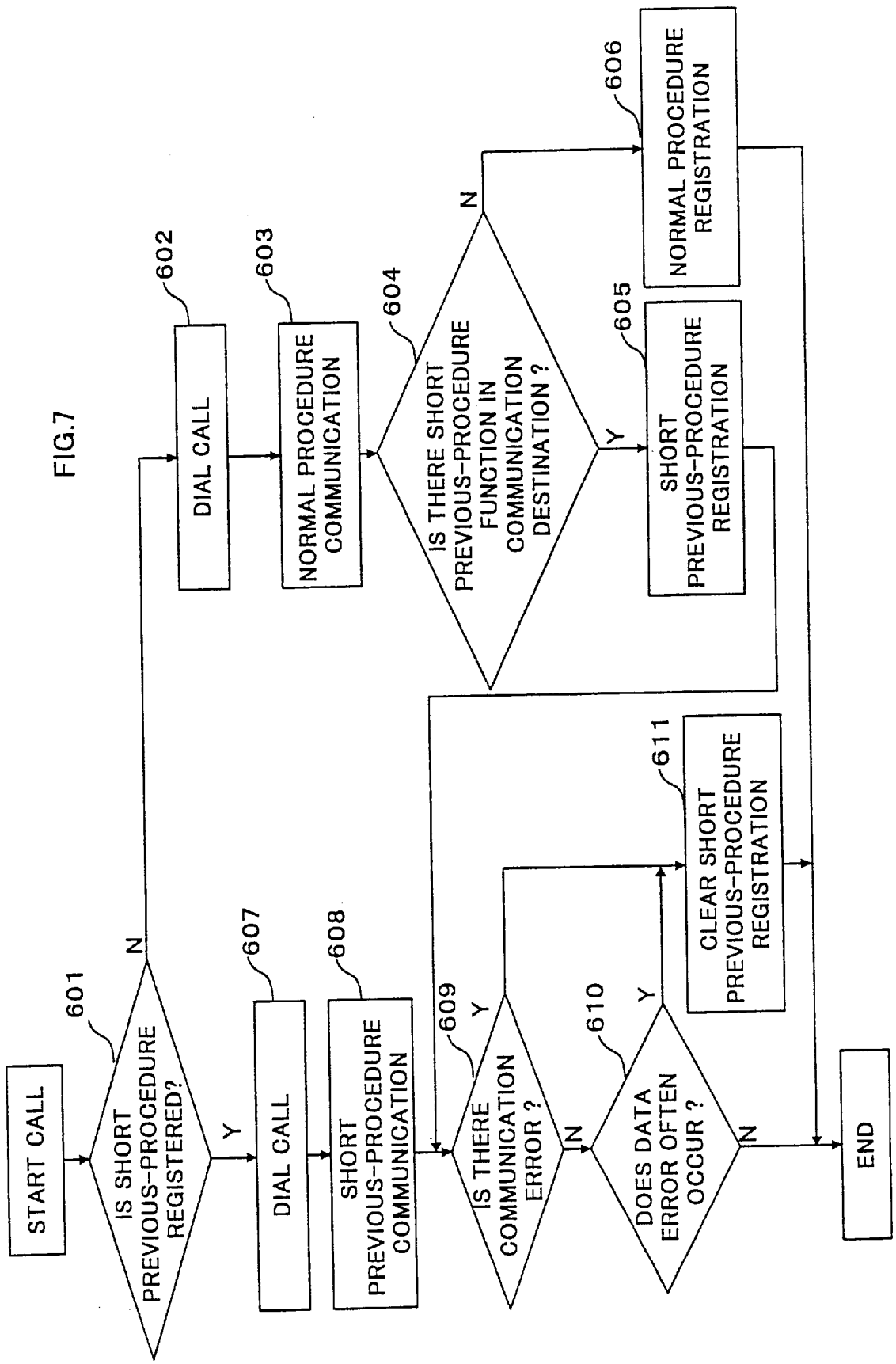
FIG. 7 is a flowchart showing a control operation at the time of calling of the data communication apparatus according to the first embodiment.

First of all, the operation of a caller modem for carrying out transmission will be discussed. FIG. 7 is a flowchart illustrating a control operation of a facsimile apparatus according to this embodiment at the time of calling.

In step (hereinafter referred to as ST) 601, calling is initiated in accordance with the telephone number of a transmission destination and a transmission start instruction from the operation section 107. Then, the memory 108 is searched to check if the telephone number of the transmission destination is registered for a short previous-procedure. When registration is not made, the flow proceeds to step S602 to make dialing.

In ST603, facsimile communication is carried out in a normal communication protocol based on T.30 AN-EXF of the ITU-T.

In ST604, if it is confirmed whether or not the facsimile apparatus on the answering side has a short previous-procedure function. This confirmation is carried out by detecting a flag denoting that communication by short previous-procedure is possible in a field for a non-standard procedure signal NSF included in a facsimile control signal.

Then, if it is confirmed that the facsimile apparatus on the answer side has a short previous-procedure function in step S604, normal communication is performed on the calling side, and registration for various kinds of parameters necessary for executing the short previous-procedure is executed. The contents to be registered in the short previous-procedure includes, for example, selection information such as power reduction value and a carrier, and selection information such as optimal training time and non-linear distortion compensation. The contents to be registered for a short previous-procedure are stored in the memory 108 in accordance with the memory structure of the short previous-procedure registration memory illustrated in FIG. 8.

Note that communication in a normal communication protocol is carried out in ST606 when no flag showing that communication by the short previous-procedure is possible is detected in ST604.

Also, in ST607 to ST608, a dial call is made and a communication by short previous-procedure is carried out in a case where the short previous-procedure is registered in ST601. In the short previous-procedure, a modem parameter in the short previous-procedure registration memory 108 is sent to the transmission destination in the start procedure to execute the transmission operation according to the modem parameter. This eliminates the need for negotiation with the receiver, so that communication time can be reduced.

In ST609, the presence or absence of a communication error is determined. If there is no communication error, the flow proceeds to ST610. In ST610, the rate of data errors in communication is determined, and when there are not many data errors, the process will be terminated. This error rate decision may be made based on the number of resends in, for example, ECM.

If it is determined that there is a communication error in ST611 and that there are many data errors in ST610, the contents of the short previous-procedure registered for the transmission destination are erased from the memory 108, after which the process will be terminated.

The reason why a communication control protocol is executed in accordance with various communication parameters, which have been prestored in association with destination telephone numbers in the above manner, is based on the following consideration.

Generally, facsimile apparatuses are often connected one to a single line. As communication is often carried out in the same mode with respect to the same communication destination, therefore, a control protocol for exchanging the data communication mode need not be executed every time communication is carried out if the previous communication mode is stored in a transmitting apparatus and a receiving apparatus.

Because the quality of a telephone line has been improved due to the recent widespread of digital exchanges, therefore, there becomes no difference in the line characteristic, which originates from a difference in connection paths. As a result, similar line characteristic and communication quality are always provided for the same communication destination. If previous modem parameters are stored, it is unnecessary to conduct a communication protocol associated with line probing for each communication.

Further, the training time, which is set in accordance with the learning time for the filter coefficient of the adaptive equalizer of a receiving apparatus, is generally set to the length that can be adapted for every line. When communication is implemented over a line with a high communication quality, the learning time for the filter coefficient can be shorter than the normally set one, so that the training time may be wasted. In view of the above, reduction in the execution time of a previous-procedure is realized by carrying out the previous-procedure using a prestored communication parameter.

Figure 9:
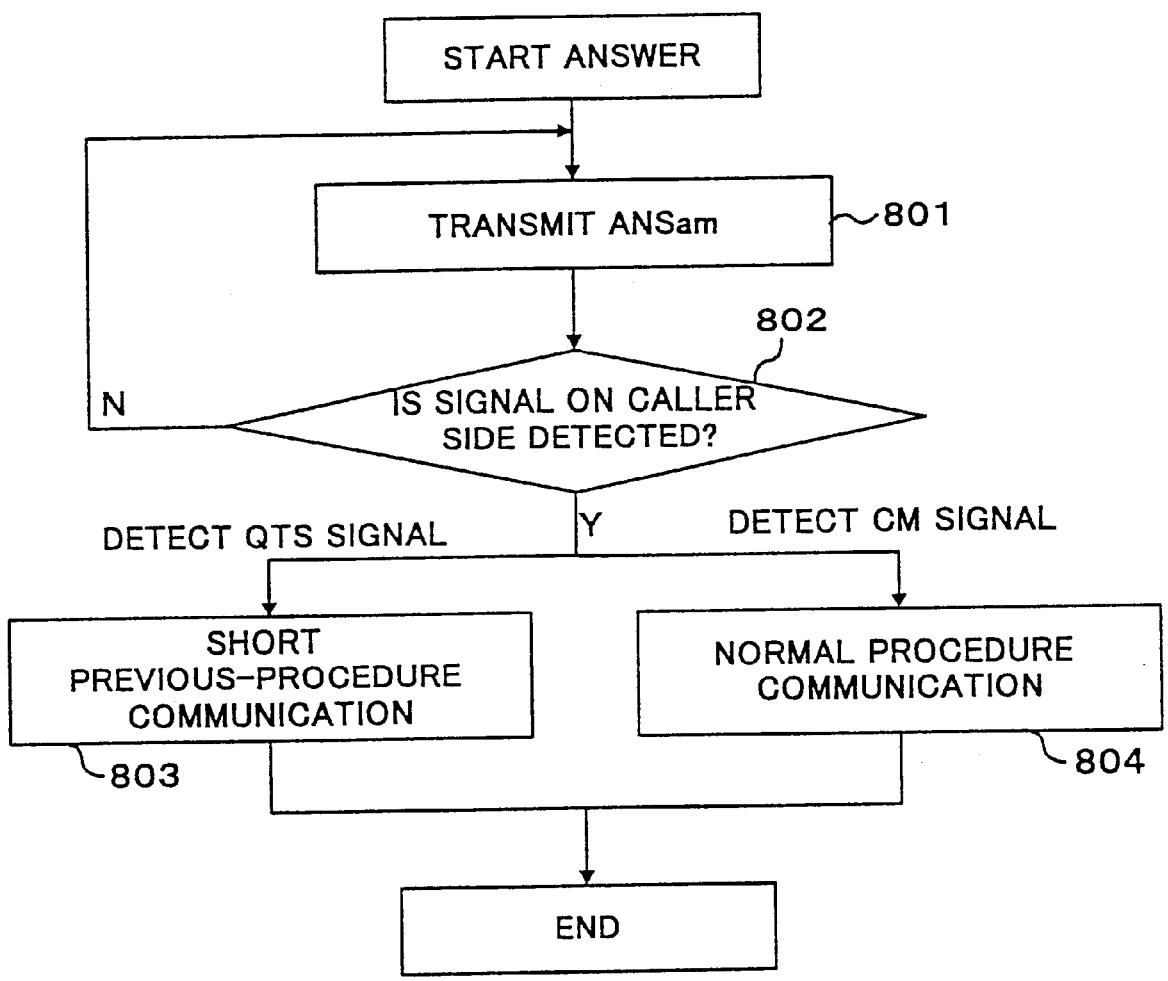
FIG. 9 is a flowchart illustrating a control operation at the time of answering of the data communication apparatus according to the first embodiment.

Next, the operation of the receiver of an answer modem will be explained. FIG. 9 presents a flowchart illustrating a control operation for a previous-procedure at the time a facsimile apparatus according to this embodiment receives an incoming signal.

In ST 801, after receiving a reception command sent over the line 106, a deformed answer tone ANSam is transmitted.

In ST 802, it is detected whether to receive a quick tonal signal (QTS) indicating a short previous-procedure or a call menu signal CM from the caller modem, while sending the ANSam signal.

In ST 803 and ST 804, communication is executed by a short previous-procedure using a registered communication parameter when the QTS signal is detected, while communication is executed by a normal previous-procedure according to the T.30 ANEXF of the ITU-T when the CM signal is detected. When the receiver is equipped with a function to conduct a short previous-procedure, a short previous-procedure registration flag indicating that the self-apparatus has the short previous-procedure function and the optimal training time are described in the non-standard protocol signal NSF field of the facsimile control signal when communication is carried in the normal protocol. The transmitter registers a short previous-procedure for this receiver based on the information in the NSF field.

Next, the flow of processing for executing the short previous-procedure registration in the apparatus on the calling side will be explained along the flowchart shown in FIG. 10. The previous-procedure to register the short previous-procedure is carried out in accordance with a normal communication protocol according to Recommendation V.34 already explained.

In ST901 to 902, the transmitter carries out dial calling and CNG transmission, and waits for incoming a deformed answer tone ANSam to be transmitted from the receiver.

In ST903 to ST905, a control protocol is executed in a conventional G3 protocol (300 bps) when the deformed answer tone ANSam is not detected in ST902. On the other hand, when the deformed answer tone ANSam is detected in ST902, it is further determined whether or not a modem parameter corresponding to the receiver destination is registered in the memory 108. When the modem parameter corresponding to the receiver destination is not registered therein in ST904, the short previous-procedure of V.34 is executed. This short previous-procedure will be described later.

In ST906 to ST909, the communication procedure 19a for selecting a modulation mode, the communication procedure 19b for line, the communication procedure 19c for modem training, and the communication procedure 19d for setting a modem parameter are executed to perform control channel reception, after which the facsimile control procedure is executed.

In ST910, in the facsimile control procedure, it is determined whether or not there is a flag, which shows that the receiver is equipped with a function to execute a short previous-procedure in the NSF (nonstandard protocol) field transmitted from the receiver. Although various kinds of nonstandard functions relating to the execution of V.34 communication protocol can be set in the NSF field, this is not related to the present invention and the explanation will be omitted.

When the receiver is equipped with a function to execute a short previous-procedure in ST911 to ST914, it is confirmed whether or not the calling is originated by the memory key operation. In the case of YES, it is confirmed whether or not a modem parameter can be registered, after which various kinds of modem parameters in ST906 to ST909 are registered in association with the destination of the memory key and shifts to V.34 communication protocol. If registration processing for modem parameters is prohibited in ST912, storage processing for various kinds of modem parameters is not executed in ST913.

Moreover, after communication is executed in a communication protocol of any one of ST903, ST905, ST915, a storage parameter of storing means is checked in ST915. In other words, if there is a high error possibility that a short previous-procedure will not succeed within guard time, the modem parameter of the memory 108 is erased, and the update for storage parameter is carried out as required. The check for storage parameter and the update therefor will be described later.

When the receiver is not equipped with a function to execute a short previous-procedure in NSF, the protocol shifts to V.34 communication protocol directly. Even when the calling is not generated by the memory key operation, the protocol shifts to V.34 communication protocol. The reason is that an area for a modem parameter registration is preset in the memory in the case of the dial calling due to the memory key and no parameter storing area is provided in the case of the dial calling due to the normal 10-button keypad operation.

Thus, the communication protocol at the registration of a short previous-procedure is carried out in the normal protocol as recommended by the T.30 ANEXF of the ITU-T, various kinds of modem parameters are registered in the memory 108 of the caller modem, so that communication can be implemented using the registered parameter from the next time.

A communication protocol in the case of carrying out the above short previous-procedure will now be discussed specifically.

Figure 11:
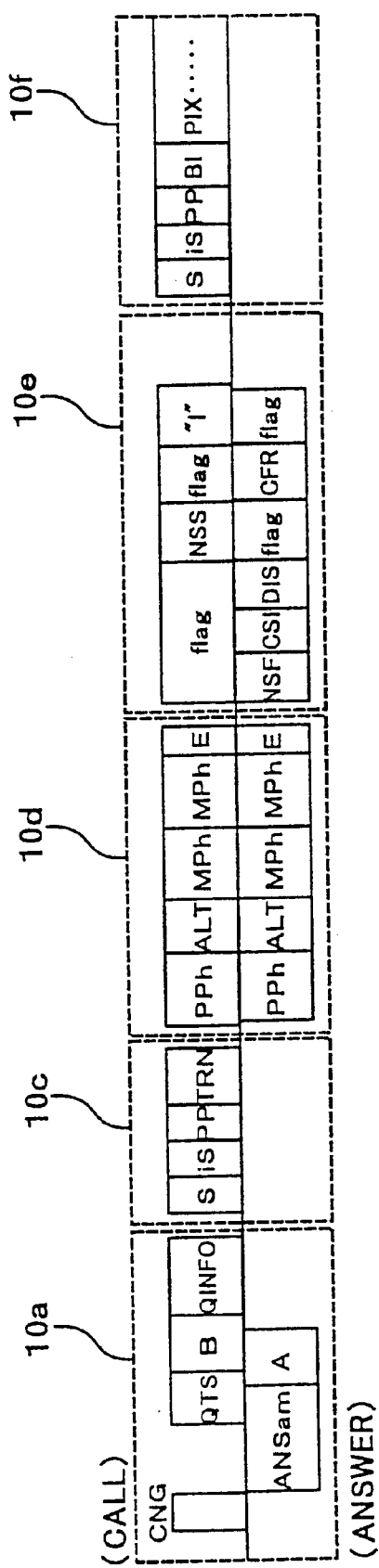
FIG. 11 is a control signal chart at the time of executing the short previous-procedure of the data communication apparatus according to-the first embodiment.

FIG. 11 is a control signal chart for a communication protocol at the time of executing a short previous-procedure, and illustrates a communication process from the establishment of a line connection up to communication of image data. After a line connection is established, a communication procedure 10a for initiating a short previous-procedure is performed, after which a communication procedure 10b for modem training is executed in accordance with registered time, and a communication procedure 10c for setting a modem parameter, a communication procedure 10d for a facsimile control signal and a data communication procedure 10e for sending data (image data) will be carried out.

First of all, the communication procedure 10a for initiating a short previous-procedure will be explained. A caller modem sends a caller number identification signal CNG, and an answer modem sends a deformed answer tone ANSam. After detecting this deformed answer tone ANSam, the caller modem sends a quick tonal signal QTS, and sends tones B and QINFO upon detection of a response signal tone A from the answer modem. After detecting the quick tonal signal QTS from the caller modem, the answer modem sends the tone A and receives the QINFO from the caller modem.

This quick tonal signal QTS indicates a signal to command shift to the short previous-procedure. The quick tonal signal QTS is a repeated pattern of "001100110011 . . . ". The reason why such a tonal signal pattern is used is to permit the receiver to clearly distinguish the received the quick tonal signal QTS from a signal pattern of the flag sequence ("011110") and the tonal signal pattern of the call menu signal CM (2-bit start bits "10," 8-bit data and stop bit of "1"), which are defined by Recommendation T.30 of the ITU-T. Moreover, as the quick tonal signal QTS has the same modulation system as the call menu signal CM, the receiver modem can easily discriminate whether the communication is to be implemented in a short previous-procedure or a normal previous-procedure, depending on whether the incoming tonal signal is the quick tonal signal QTS or the call menu signal CM.

Figure 1:
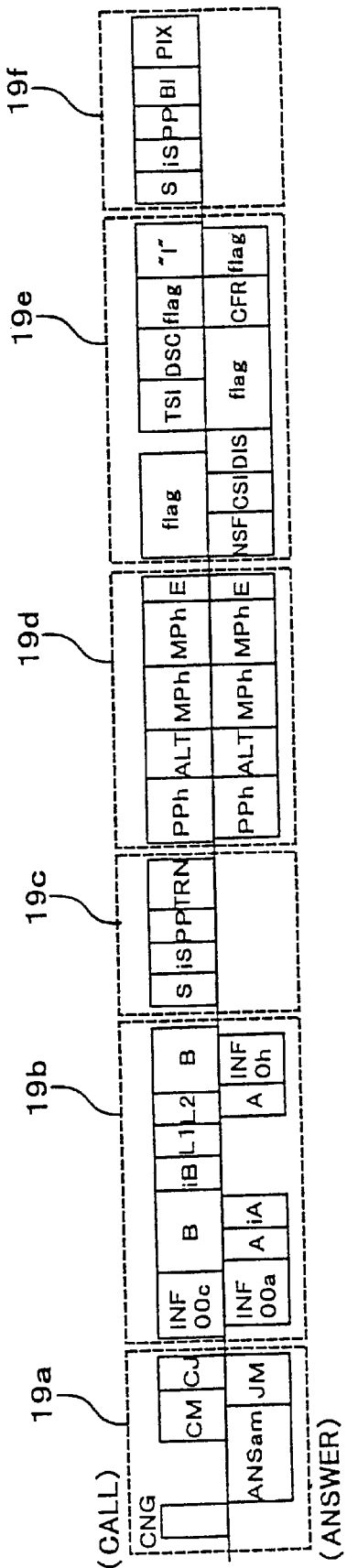
FIG. 1 is a control signal view showing a communication protocol using a V. 34 modem according to prior art.

As explained in FIG. 7, in the QINFO sequence, communication is carried out with V.21 modem 204 (300 bps, full-duplex) in accordance with the contents registered in the short previous-procedure registration memory for each communication destination's telephone number, i.e., in accordance with the training parameter (INFO0h) at a short previous-procedure registration time, the optimal training time and the selected contents for non-linear distortion compensation. The use of the above QINFO sequence can delete signals CM, JM, CJ of communication procedure 10a and the line probing procedure 19b shown in FIG. 1, which are needed in the normal previous-procedure. Also, modem training time can be shortened. As a result, time required for previous-procedure can be shortened by amount of time corresponding to the above deletion and the reduction in the modem training time.

In the next communication procedure 10c for modem training, training the calling side apparatus and the answering side apparatus is performed in accordance with the training parameter (INFO0h) of the QINFO sequence and the optimal training time. Since the optimal training time is necessary minimum time registered in advance, this results in time reduction in previous-procedure.

In the communication procedure 10d for setting a modem parameter, the MPH for the answer modem is set based on the QINFO-based selection of non-linear distortion compensation and information on the SN ratio computed in the communication procedure 10c for modem training. Therefore, this sequence can also shorten time.

The facsimile control procedure 10e and the data communication procedure 10f are the same as the normal V.34 communication protocol.

The communication protocol in the short previous-procedure is carried out in such a manner that the communication procedure for starting the short previous-procedure is executed in an exclusive procedure and the communication procedure for modem training and the subsequent communication procedures are basically performed in accordance with the recommendation for T.30 ANEXF of the ITU-T, thereby realizing the reduction in the entire communication time.

In the normal case, the aforementioned short previous-procedure is registered and executed, thereby realizing the reduction in communication time.

However, in the above-explained short previous-procedure, if various kinds of modem parameters are once registered to a specific destination, the communication by the short previous-procedure mode is always executed in the subsequent communication. For this reason, if a registered modulation mode of the destination's receiver is changed and the line characteristic is changed, the sequence for executing the updating is omitted. This causes a problem in which the set value of the modem parameter cannot be updated in accordance with the changed modulation mode and line characteristic. More specifically, the modulation mode and the line characteristic vary in the following cases, and there often occurs a case in which a normal short previous-procedure cannot be executed with the registered modem parameter.

The communication apparatus on the receiver side, which is equipped with the short previous-procedure, is replaced with another apparatus, which is not equipped with the short previous-procedure.

The registered destination is a representative telephone, and the kind of destination's apparatus is changed every time when connection is made.

The communication time zone and an LCR function exert an influence upon the change in the communication path.

Transoceanic communication is carried out via submarine cable or satellite.

The present invention has been structured such that requirement on the registration of the modem parameter for a short previous-procedure and the update on the registration are dynamically changeable in accordance with such circumstances. Thereby, a problem in which success of a short previous-procedure is not attained or a bit rate is reduced can be avoided to the greatest extent practicable.

Figure 12:
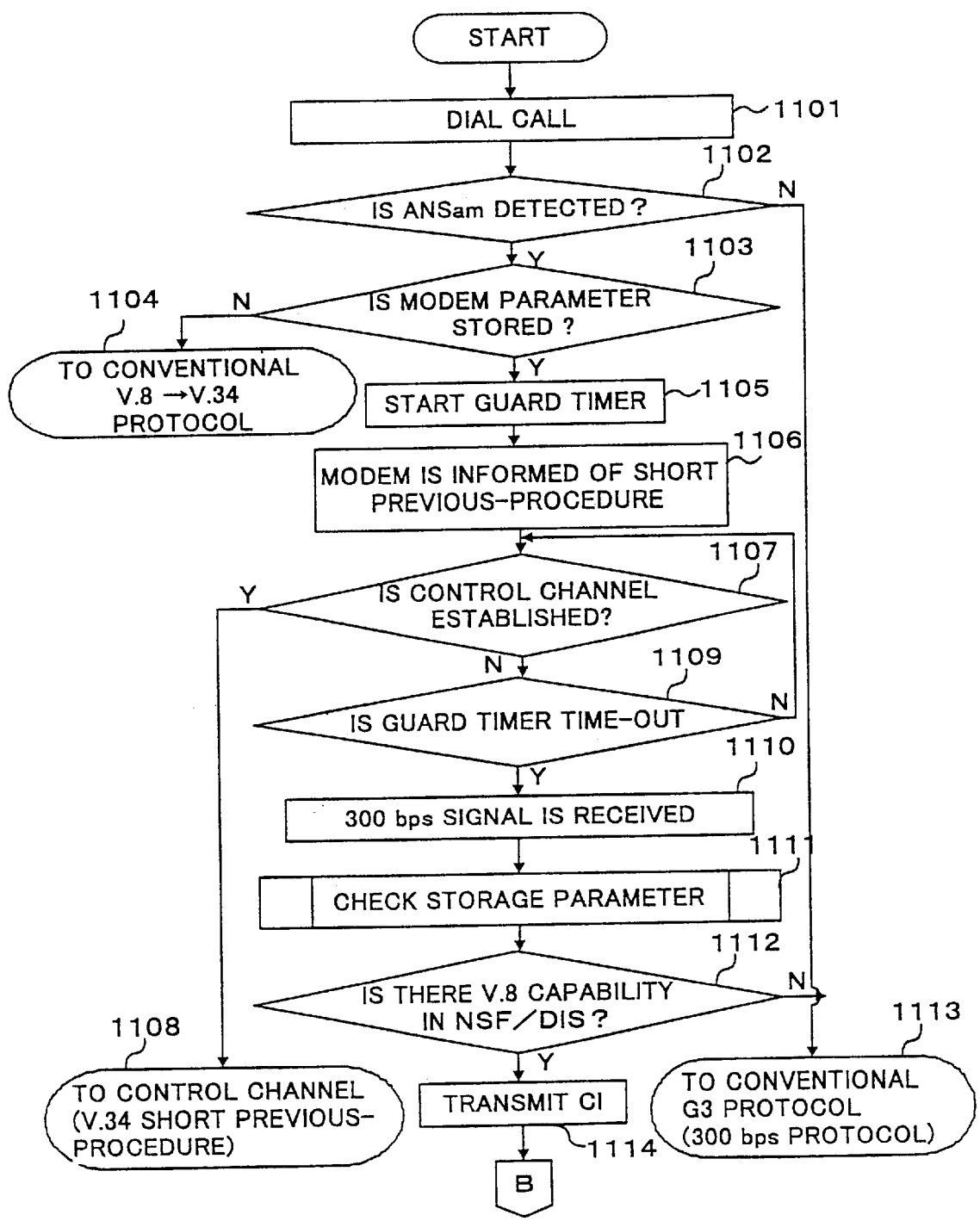
FIG. 12 is a flowchart illustrating an update processing of a modem parameter of the data communication apparatus according to the first embodiment when the short previous-procedure is registered.

Next, an update processing for a modem parameter, which has been once registered in a short previous-procedure, will be explained along the flowchart shown in FIG. 12. FIG. 12 is a flowchart explaining the processing when the transmitter fails in the recovery by the modem and a shift to a short previous-procedure cannot be made.

In ST1101 to ST1102, the transmitter carries out dial calling and CNG transmission, and waits for incoming a deformed answer tone ANSam to be transmitted from the receiver. When the deformed answer tone ANSam is not detected, this means that the receiver does not support V.34 communication protocol, and the protocol shifts to the conventional G3 protocol.

In ST1103 to ST1104, it is checked whether or not a modem parameter is registered in the memory 108. When the modem parameter is not registered therein, the protocol is-shift to a normal V.34 communication protocol.

In ST1105 to ST1108, a guard timer starts counting for 15 seconds, after which the transmitter executes a short previous-procedure. In other words, a quick tonal signal QTS is transmitted and a communication procedure 10a for initiating a short previous-procedure is executed. Thereafter, a communication procedure 10c for modem training is executed. At this time, it is detected whether or not the short previous-procedure proceeds to a control channel, that is, a communication procedure 10d for setting a modem parameter.

When the short previous-procedure proceeds to the control channel and the setting of the modem parameter is completed before a time-out of the guard timer, the communication procedure proceeds to a communication procedure 10e for a facsimile control, and V.34 communication protocol is executed. The control channel described here is the sequences 10d and 10e shown in FIG. 11.

In ST1109, when the time-out of the guard timer occurs, the apparatus on the transmitter side is in a signal reception waiting mode of 300 bps, that is, T. 30 NSF/CSI/DIS reception standby state. The time-out occurs when a state in which there is no response of a PPh signal from the apparatus on the receiver side is continued and passed for 15 seconds even though the modem proceeds the procedure from the transmission of the QINFO signal to that of the PPh signal and executes recovery processing.

In ST1111 to ST1113, check processing for the parameter registered in the memory 108 is executed, after which the received NSF or DIS is inspected so as to conform whether or not the apparatus on the receiver side supports V.8 communication protocol. When the apparatus on the receiver side does not support V.8 communication protocol, the procedure is shift to a conventional G3 protocol.

Although the above check processing for the parameter in ST1111 will be described later, the modem parameter of the memory 108 is erased and its update is carried out as required as described later when the short previous-procedure does not succeed within guard time.

Thus, when the short previous-procedure does not normally proceed within 15 seconds, a shift to the signal waiting mode of 300 bps is carried out. The reason will be explained as follows:

Specifically, when the apparatus on the receiver side is not equipped with the short previous-procedure function, there is a high possibility that NSF signal of 300 bps, DIS signal, etc. will be transmitted. For this reason, the apparatus receives these signals, and executes the G3 communication protocol, thereby continuing communication. This processing can avoid the worst case in which a communication error occurs.

Moreover, the reason why the guard time is set to 15 seconds will be explained as follows:

Specifically, in T.30 protocol, it is defined that the transmission of NSF/CSI/DIS is repeated for 35 seconds, and the interval among NSF/CSI/DIS is 3 seconds. Although the length of NSF/CSI/DIS differs, depending on the length of NSF, the length is normally tens of octets and is within the range of 3 to 5 seconds. If a shift to T.30 protocol is carried out after a lapse of 15 seconds from the start of communication, the apparatus on the transmitter side can receive NSF/CSI/DIS signals a plurality of times. In a case of the failure in the short previous-procedure, NSF/CSI/DIS signals must be received at least twice to receive these signals without fail. For this reason, the guard time, which is required for the above reception, is reserved and determined. This can surely avoid the worst case in which the short previous-procedure ends in failure and the shift to T. 30 protocol cannot be carried out.

In view of avoiding the communication error, it is possible to use a method in which a number of times of retrying a short previous-procedure and a number of times of transmitting a specific signal are counted in place of guard time.

In ST1114, a shift to processing B is carried out to execute normal V.34 protocol when it is determined that the apparatus on the receiver side supports V.8 communication protocol in ST1112.

Processing B is one that executes V.34 protocol and short previous-procedure registration processing at the same time. The shift to processing B makes it possible to acquire the modem parameter again and to improve reduction in communication time by execution of communication in a short previous-procedure in the subsequent communication even if the short previous-procedure does not normally proceed.

In ST1111, the modem parameter of memory 108 was erased when the modem failed in the recovery and the time-out of guard time occurred. The reason can be explained as follows:

Specifically, if the contents of memory 108 remains cleared, a short previous-procedure is not executed in a next communication and a normal previous-procedure is carried out. If an error in executing the short previous-procedure this time lies in the other reason and not the reason that the receiver does not support the short previous-procedure, no short previous-procedure can be preferably executed in the subsequent communication.

Figure 10:
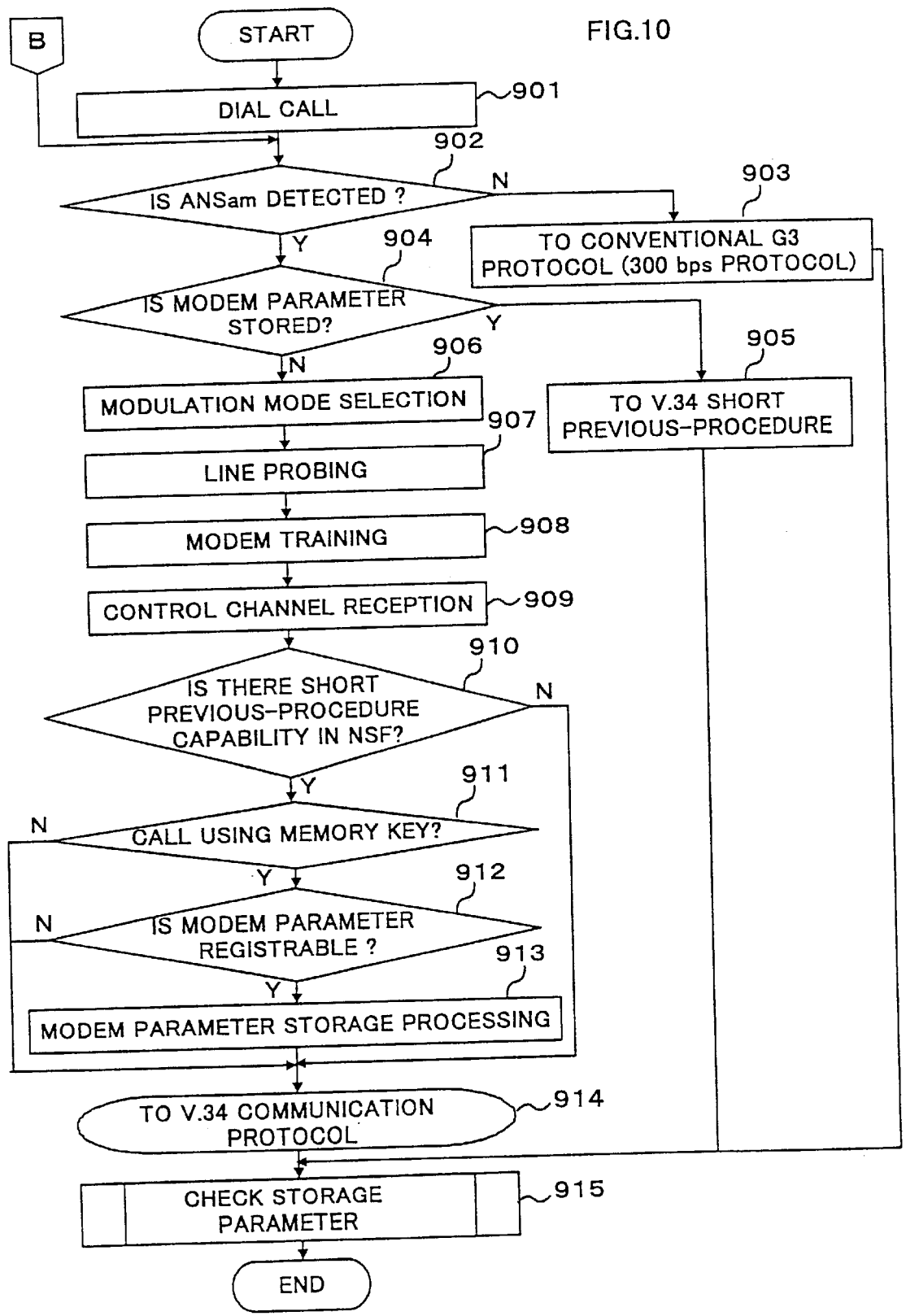
FIG. 10 is a flowchart showing a control procedure at the time of registering a short previous-procedure of the data communication apparatus according to the first embodiment.

According to the present invention, processing B, that is registration processing for a short previous-procedure shown in FIG. 10 is repeated. Thereby, V.34 normal protocol is executed with respect to the receiver, and short previous-procedure registration processing for registering a modem parameter is carried out.

In the above series of processing, when an error is occurred at a normal V.34 protocol execution time, the procedure is shifted to T.30 protocol so as to continue the communication. While, when an error is occurred at a short previous-procedure execution time, V.34 protocol is retried to update the modem parameter. In this case, the execution of the short previous-procedure shows that communication has been actually performed in a short previous-procedure previously though the error is generated. Therefore, there is a high possibility that the short previous-procedure will be normally executable again by the update of the modem parameter. For the above reason, try processing is carried out at the short previous-procedure execution time as mentioned above.

Figure 13:
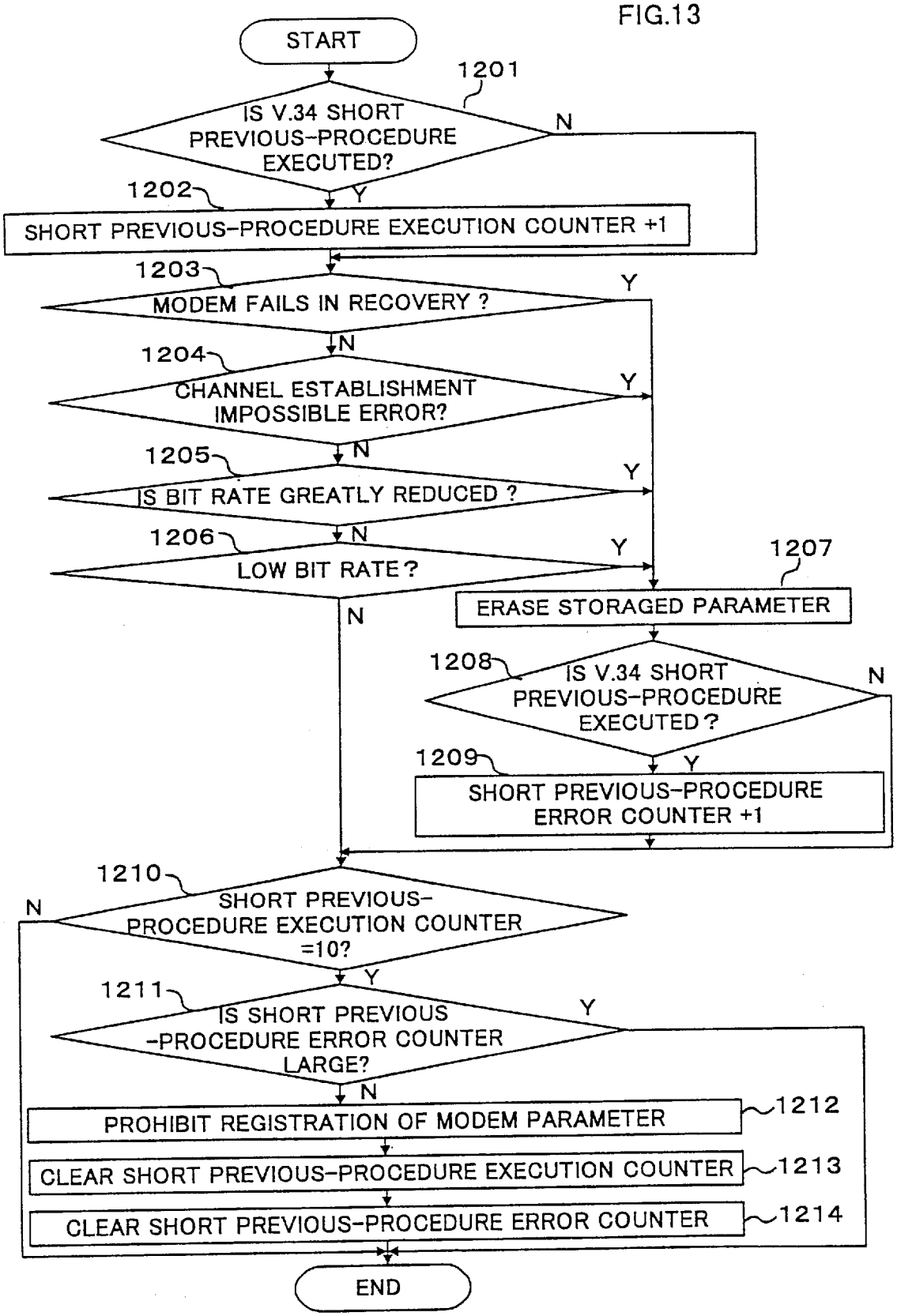
FIG. 13 is a flowchart illustrating a check processing of a storage parameter of the data communication apparatus according to the first embodiment.

Next, check processing for a storage parameter in ST1111 will be explained along the flowchart shown by FIG. 13. When an error is occurred in communication at a short previous-procedure execution time or a normal previous-procedure execution time this sequence erases the modem parameter registered in accordance with the circumstances and stops the modem parameter registration processing at the time when an error rate reaches a fixed value or more. This is based on the consideration in which it is no use of repeating the registration of the modem parameter when communication cannot be normally made even if the registration of modem parameter is tried a fixed number of times. Processing for trying a short previous-procedure registration is repeated up to the set number of times.

In ST1201 to ST1202, the short previous-procedure is once registered, after which a short previous-procedure execution counter is incremented every time V.34 protocol is executed.

In ST1203 to ST1207, when the short previous-procedure is normally ended, the modem parameter stored in the memory 108 is erased. The erase of the modem parameter is specifically carried out in the following cases:

First, the erase of the modem parameter is carried out when the modem fails in the recovery. That is a case in which ANSam is detected and the quick tonal signal QTS is sent from the apparatus on the transmitter side but the signal does not reach the control channel. This is because communication time at no short previous-procedure execution becomes shorter when an error is generated again at a next short previous-procedure execution time.

Second, the erase of the modem parameter is carried out when an error is generated in the establishment of control channel. That is a case in which the communication previous-procedure is completed but an image information channel connection ends in failure and a trouble, which is caused at a control signal exchanging time between pages such as MPS after the image information channel. There is a high possibility that both cases will be ascribable to the fact that the modem parameter is not appropriately set.

Third, the erase of the modem parameter is carried out when a transmission error often occurs during communication so that a bit rate is considerably reduced. For example, there is a case in which a line condition is extremely good at a modem parameter setting time but poor in an actual communication. Particularly, since transoceanic communication is carried out via submarine cable or satellite, a quality of line often differs between a modem parameter registration time and an actual communication time. In such a case, communication speed in a state that the set modem parameter is not used seems to be improved. The determination of the reduction in bit rate may be performed by detecting an error rate in communication and sequentially comparing the detected error with an error rate prestored at a communication start time.

Fourth, the erase of the modem parameter is carried out when the transmission bit rate is lower than a reference value. In this case, 14.4 kbps of V.17 communication protocol is used as a reference value, and the registered modem parameter is erased when the bit rate is less than the reference value. This is because the communication speed in V.17 protocol is faster than the communication speed in V.34 protocol in accordance with the registered modem parameter.

In any process of communication started in the short previous-procedure and any process of communication at a normal V.34 protocol execution time, the memory 108 is erased and the modem parameter is-not registered when the aforementioned communication troubles exist.

In ST1208 to ST1209, it is confirmed whether or not communication is carried out in a short previous-procedure. When communication is carried out in the short previous-procedure, a short previous-procedure error counter is incremented. When communication is not carried out in a short previous-procedure, a shift to next procedure is carried out without incrementing the count value. The count value is used in the following processing.

In ST1210 to ST1211, it is checked whether or not the number of execution times of short previous-procedure reaches 10. Then, it is determined whether or not a count value of a short previous-procedure error number counter is a fixed value or more at the time when the counter counts up. This determination may be executed based on whether or not an error rate exceeds a fixed value and not based on the cumulative number of times of error generation. For example, in a case where the error rate is determined every time when the number of execution times of short previous-procedure reaches 15, two counters each having a four-bit structure may be prepared. For this reason, this determination can be carried out with a register of one bit.

In ST1212 to ST1214, when the error rate is the fixed value or more in ST1211, the registration of modem parameter is prohibited, and the clear of the short previous-procedure execution counter and that of the short previous-procedure error counter are executed. In this case, the modem parameter registered in storing means is erased such that no short previous-procedure is executed in the subsequent communication.

When communication error is occurred in communication in which the short previous-procedure is executed, the memory 108 is set to be in a vacant state so as to try register the modem parameter continuously in communication including next and after. As a result, when the short previous-procedure error reaches the fixed value or more, a shift to registration processing of a modem parameter for a short previous-procedure is prohibited such that no short previous-procedure can be executed. While, when the execution of short previous-procedure ends in failure, the above is unfavorable since it takes more time than normal communication.

Next, a modification of the above registration prohibition function for a modem parameter will be explained along a flowchart shown in FIG. 14. In the flowchart of FIG. 13, the error rate is computed at the time when the number of execution times of short previous-procedure reaches 10. While, in the flowchart of FIG. 14, when the number of error times reaches a fixed value or more, the registration function for a modem parameter is stopped even if the number of execution times of short previous-procedure is before 10. Since the first half of processing of FIG. 14 is the same as that of processing of FIG. 13, the explanation will be omitted.

Figure 14:
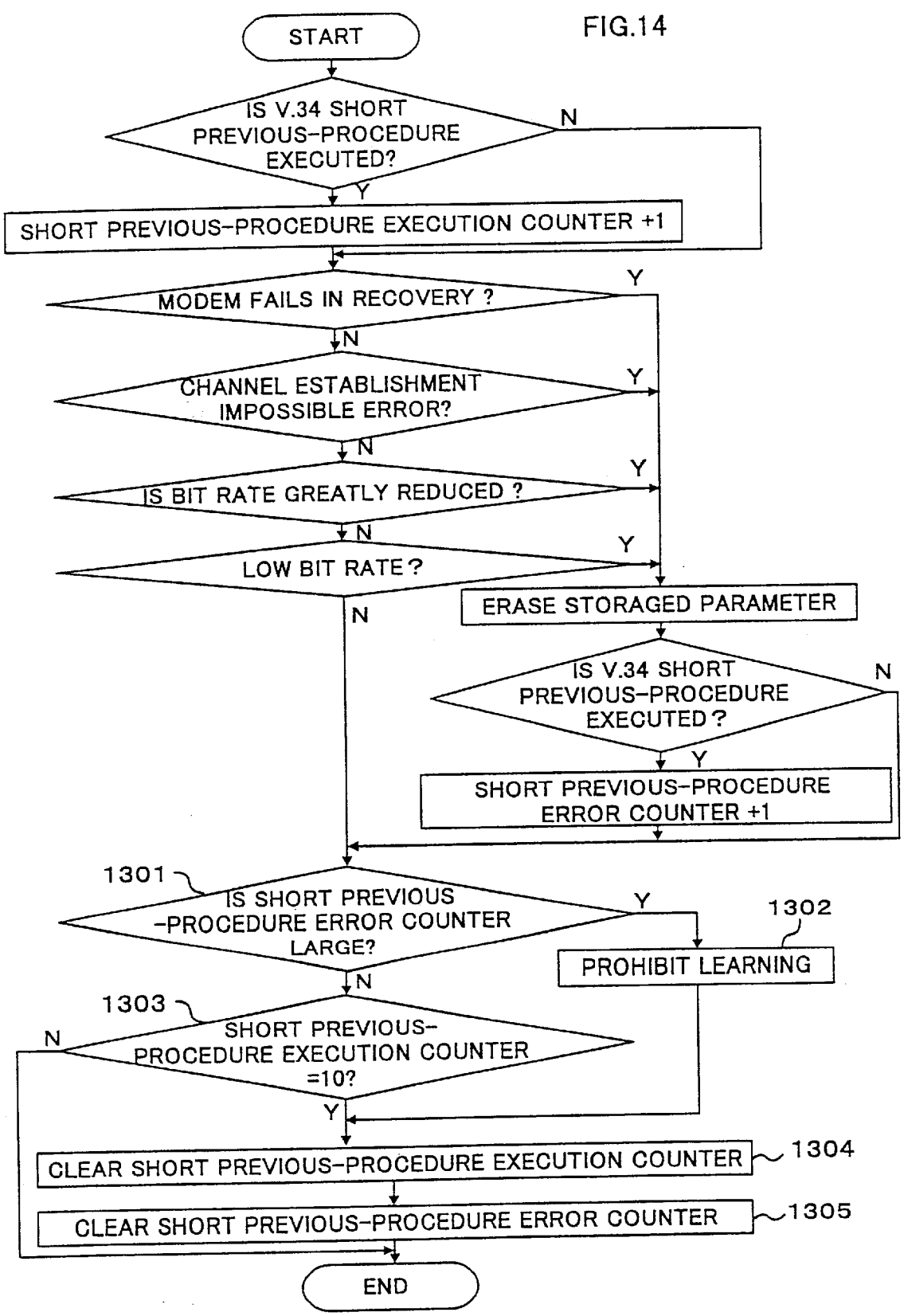
FIG. 14 is a flowchart illustrating a modem parameter registration prohibit processing of the data communication apparatus according to the first embodiment.

In ST1301 to ST1302 of FIG. 14, when the short previous-procedure error counter exceeds the fixed value or more, the registration function for a modem parameter is stopped.

In ST1303 to ST1305, when the short previous-procedure execution counter reaches 10, the clear of the short previous-procedure execution counter and that of the short previous-procedure error counter are executed.

In other words, by the aforementioned processing, for example, in a case where the number of error times is four or more, this surely exceeds a predetermined error rate at the time when the counter counts up. Since the modem parameter is not registered even before the short previous-procedure execution counter reaches 10, it is possible to avoid a case in which a modem parameter with low precision is registered. By this processing, in the subsequent communication, the short previous-procedure is not executed.

Figure 15:
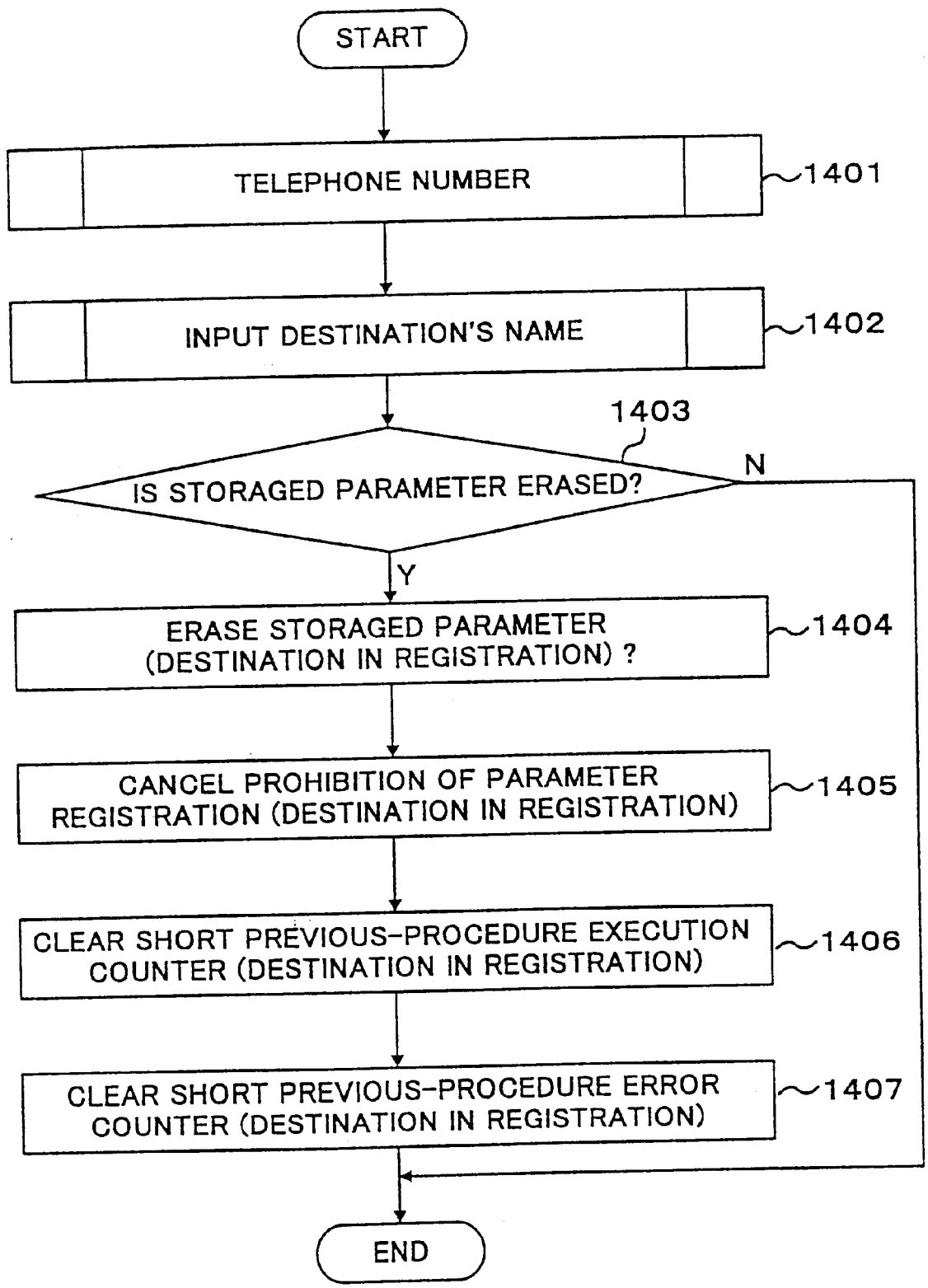
FIG. 15 is a flowchart illustrating processing of a case in which a destination name is changed according to the data communication apparatus of the first embodiment of the present invention.

Next, the following will explain processing for a case in which a destination address and a telephone number is changed when the destination address and the modem parameter are already registered in a single button dialing and an abbreviated dialing. FIG. 15 is a flowchart showing processing when there is a change in a name of destination address.

In ST1401 to ST1403, a dial input is carried out and a name of destination is input, after which it is determined whether or not the modem parameter stored in the memory 108 is erased.

In ST1404 to ST1407, the stored parameter is erased when the determination result in ST1403 is YES. Next, if the parameter registration to the memory 108 is prohibited, the prohibition is cancelled. Then, the clear of the short previous-procedure execution counter and that of the short previous-procedure error counter are sequentially executed.

On the other hand, when it is determined that the storaged parameter is not erased in ST1403, the contents registered in the memory 108 are stored as they are. This prevents all of the contents of the memory including the registered modem parameter from being erased when the change of the name is simply registered. Therefore, since it is unnecessary to newly execute processing for a short previous-procedure registration at a next communication time, communication can be carried out without extra communication time.

Figure 16:
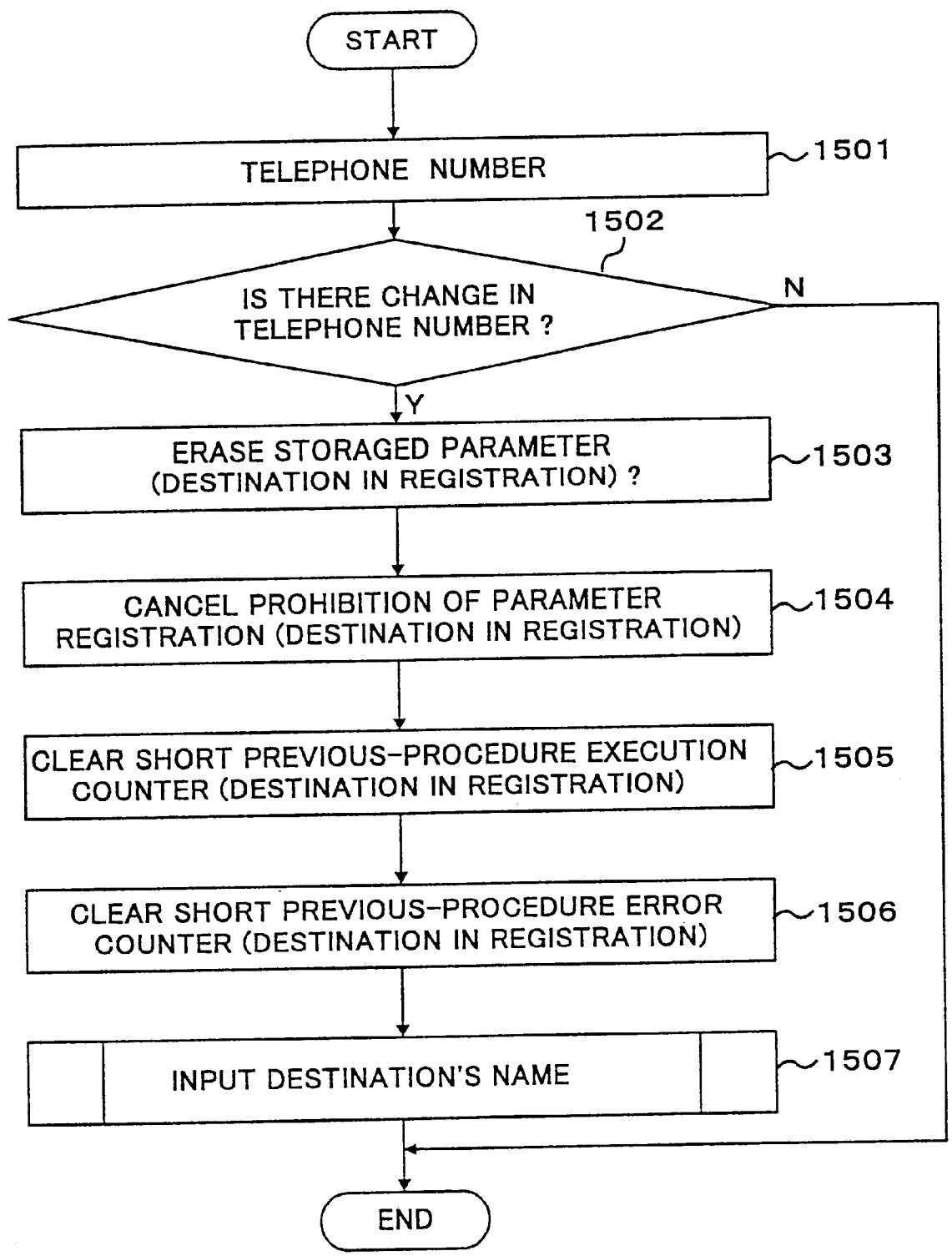
FIG. 16 is a flowchart illustrating processing of a case in which a telephone number of an destination is changed according to the data communication apparatus of the first embodiment of the present invention.

FIG. 16 is a flowchart showing processing for a case in which a destination's telephone number is changed.

In ST1501 to ST1502, a telephone number is input and it is determined whether or not there is a change in the telephone number.

In ST1503 to ST1506, if there is the change in the input telephone number, the storaged parameter is automatically erased. If the parameter registration to the memory 108 is prohibited, the prohibition is cancelled. Then, the clear of the short previous-procedure execution counter and that of the short previous-procedure error counter are executed. The change of the telephone number seems to occur in a case where the apparatus on the receiver side is changed or a case where a line is changed. Therefore, the reason why the prohibition is cancelled is to provide the destination where the execution of the short previous-procedure is once prohibited the opportunity to perform communication in a short previous-procedure again and to shorten communication time.

While, if there is no change in the telephone number in ST1502, the contents registered in the memory 108 are stored as they are, the destination is input in such a state, and processing is ended. In this case, similar to processing of the flowchart of FIG. 15, since it is unnecessary to newly execute processing for a short previous-procedure registration at a next communication time, communication can be carried out without extra communication time.

In processing shown in FIG. 15 and processing shown in FIG. 16, a selective operation is performed. This carries out the erase of the contents of the memory including the parameter automatically when there is the change in the telephone number input by an operator. On the other hand, when there is no change in the telephone number, the operator is urged to input the destination, after which a standby status whether or not the storage parameter is erased is set.

In this case, the change of the telephone number seems to occur in a case where the apparatus on the receiver side is moved or a case where a line is changed. Therefore, the reason why the contents of the memory including the parameter is automatically carried out when there is a change in the telephone number is the need for updating the modem parameter in a next communication.

On the other hand, when there is no change in the telephone number, there is included a case in which a name of destination's organization is simply changed. For this reason, a method in which either case is manually selected is left.

Figure 17:
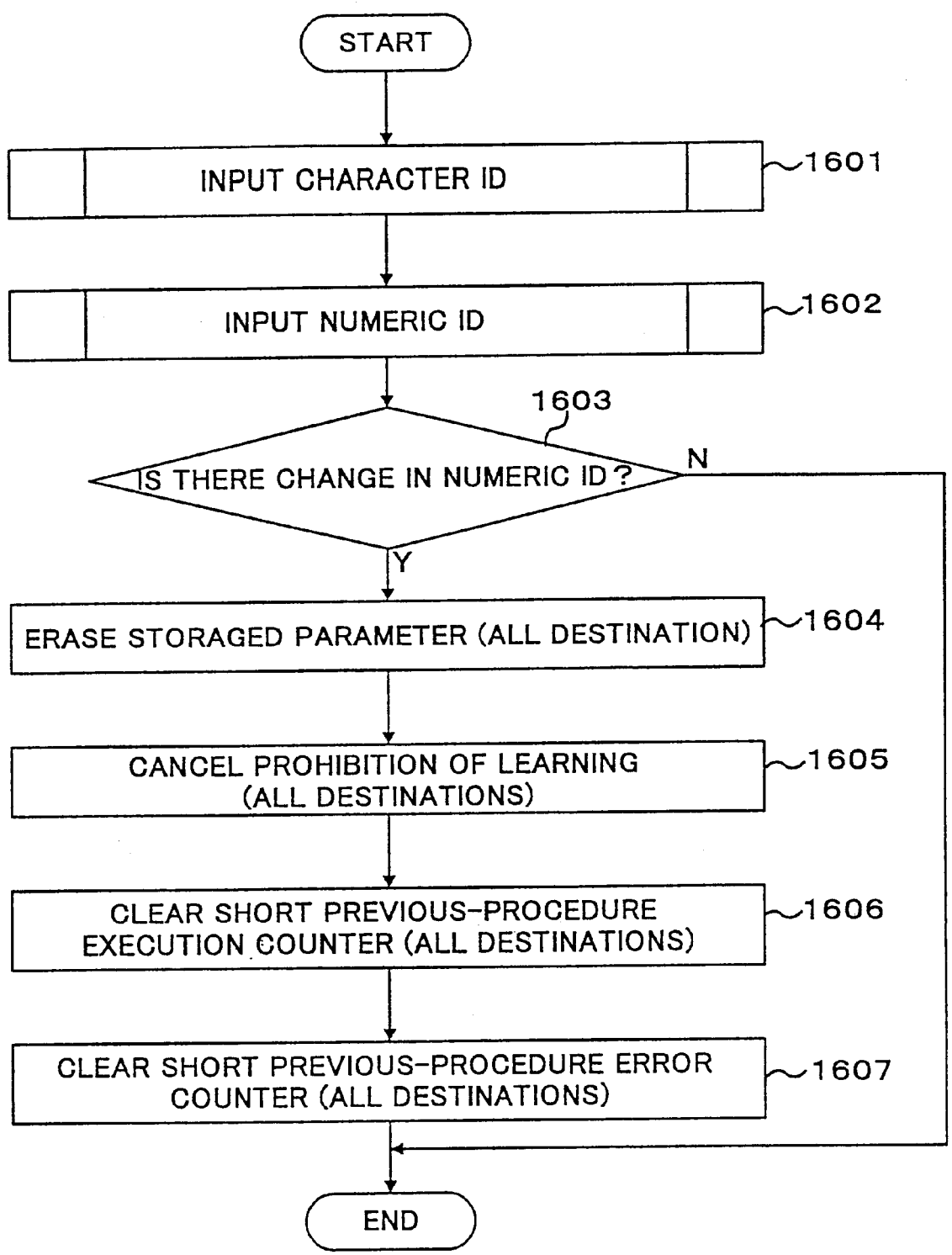
FIG. 17 is a flowchart illustrating processing of a case in which an ID information of a self-station is changed according to the data communication apparatus of the first embodiment of the present invention.

Next, the following will explain an operation for a storaged parameter of the memory 108 when there is a change in ID information of a self-station with reference to FIG. 17. Processing of FIGS. 15 and 16 is one, which-is related to how the storage parameter registered is processed when there is a change in the apparatus on the destination side where one-touch key etc., is registered. In contrast, processing of FIG. 17 is described on the assumption that there would be a change in a telephone number of the self-apparatus.

In many cases, the change in the telephone number of the self-apparatus involves a change in a line to be connected. More specifically, the line is often changed from an analog line to an ISDN. It can be considered that this case carries a change in line characteristics in most cases. In order to deal with such a case, the following processing is carried out.

In ST1601 to ST1603, a character ID and a numeric ID are continuously input, and it is determined whether or not the input numeric ID is changed.

In ST1604 to ST1607, when the input numeric ID is changed, the storage parameter of all destinations key registered is erased. Then, if the parameter registration to the memory 108 is prohibited, the prohibition is cancelled. Further, the clear of the short previous-procedure execution counter and that of the short previous-procedure error counter are carried out.

Thereby, the parameter of the memory 108 is cleared, but the destination already registered is unchanged. For this reason, update processing for a modem parameter is sequentially executed for each destination in the subsequent communication.

In the aforementioned processing, the memory clear is automatically executed. However, there is a case in which a manual execution of the memory clear is needed. For example, a terminal such as a terminal adapter is newly connected between data communication and a line, or the connected terminal is changed. In such a case, there is no change in the telephone number, but the line characteristic is changed. For this reason, it is needed that the modem parameters of all destinations be cleared and updated.

Moreover, if a continuous error occurs with respect to a plurality of destinations in the short previous-procedure, there is a high possibility that the line to which the self-apparatus will be changed from the analog line to ISDN. For this reason, in such a case, only the registered destination can be maintained as-it is, and control information corresponding to all destinations such as registered modem parameters can be all erased and updated and registered. This makes it possible to avoid a disadvantage in which the waste short previous-procedure is repeated.

The above explained the apparatus on the transmitter side.

Figure 18:
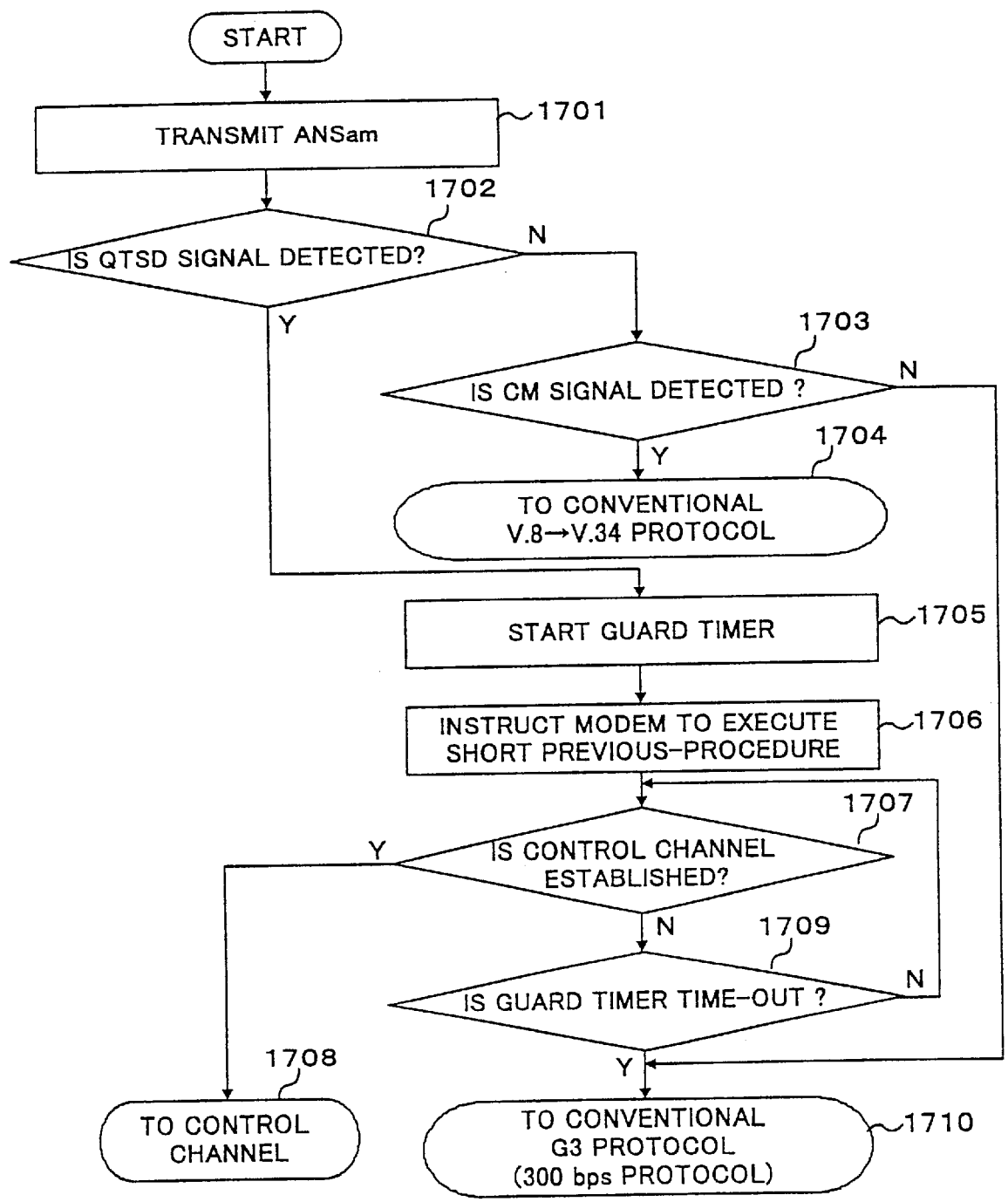
FIG. 18 is a flowchart illustrating an outline of an operation of a recipient's apparatus a flowchart illustrating processing of a case in which a telephone number of an destination is changed according to the data communication apparatus of the first embodiment of the present invention.

Next, an outline of an operation of the apparatus on the receiver side will be explained along the flowchart of FIG. 18.

In ST1701 to ST1702, the apparatus transmits a deformed answer signal ANSam to a caller number identification signal CNG incoming from the apparatus on the transmitter side, and detects a quick tonal (QTS) signal sent from the apparatus on the transmitter side.

In ST1703 to ST1704, when a call menu signal CM is detected without detecting QTS in ST1702, normal V.34 communication protocol is carried out.

In ST1705 to ST1706, when QTS signal is received in ST1702, the guard timer starts counting for 15 seconds and instructs the self-modem to execute the short previous-procedure.

In ST1707 to ST1708, it is confirmed whether or not the communication by previous-procedure reaches the establishment of a control channel through a modem training sequence, after which the control channel sequence is executed.

In ST1709 to ST1710, the counting up of the guard timer is detected, and when the guard timer counts up, communication is carried out in G3 protocol of 300 bps. When no CM signal is detected in ST1703, that is, the transmitter does not support only V.17 protocol or less, communication is similarly carried out in G3 protocol.

Thus, the reason why guard time for 15 seconds is provided even in the apparatus on the receiver side is to adapt to processing for the apparatus on the transmitter side. Namely, in the apparatus on the transmitter side, when the communication by previous-procedure does not reach the control channel during 15 seconds, a mode is changed to one that receives NSF/CSI/DIS of 300 bps to proceed G3 protocol. For this reason, there is no meaning in standby time for more than 15 seconds, and the apparatus on the receiver side moves to G3 protocol.

In the aforementioned first embodiment, after a lapse of a predetermined period of time from the registration of control information to storing means, control information can be deleted from storing means so as to execute an update of control information by parameter registering means. This makes it possible to maintain modem control information registered in storing means in an optimal state. In this case, the update period can be counted from registration time of each destination or all destinations registered may be updated at the same time by a fixed timer.

Moreover, the first embodiment explained that the registration of control information to storing means was carried out in one normal communication. However, memory control means for rewriting the modem control information registered in storing means may be provided. Ever time when normal communication pre-protocol is executed to acquire modem control information, modem control information newly acquired may be added, the modem control information registered in storing means may be corrected and recorded again by memory control means.

Furthermore, in consideration of the history of a plurality of times of communication, an average value of parameters obtained in the plurality of times of communication is calculated and suitable control information is registered instead of the point that registration of control information to storing means is performed one time. This further improves a probability of success of the short previous-procedure.

Moreover, since the correcting and learning of the parameter are carried out for each communication, the modem parameter can be maintained to have an optimal value. As a result, suitable communication having short communication time, high communication speed, and a low error rate can be carried out while using the short previous-procedure. As a rule for a parameter correction, for example, there is a method in which the main parameter of each of registered control information and new control information is plotted in a multi-dimensional space and the center of gravity of each parameter is searched so as to obtain its middle point. In this case, it is better to assign weights to data to be appropriately used, depending on the number of execution times of the past short previous-procedure. Further, to improve correction accuracy, the parameter to be used as correction data may be limited to be within a fixed range.

Second Embodiment

A data communication apparatus according to a second embodiment of the invention will be described with reference to a flowchart illustrated in FIG. 19.

While registration of a short previous-procedure is conducted in association with a destination's telephone number at the time of dialing on the apparatus on the transmitter side, the second embodiment uses a caller telephone number informing service by an exchange, which has recently started, to register a modem parameter on the apparatus on the receiver, side in association with the caller telephone number.

Figure 19:
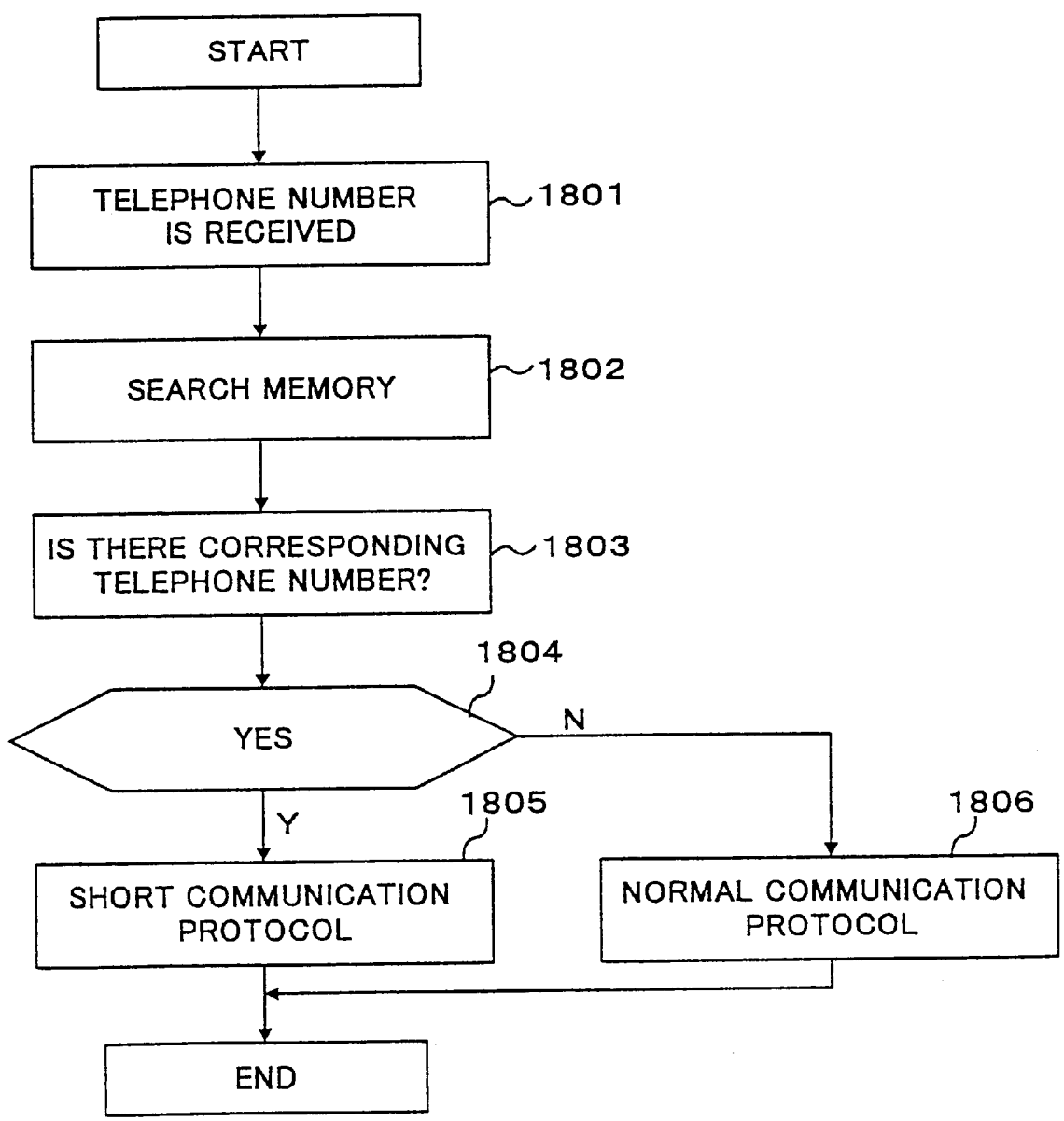
FIG. 19 is a flowchart illustrating a control protocol of a data communication apparatus according to a second embodiment of the present invention.

Referring to FIG. 19, in ST1801 to ST1803, when a receiver side is informed of a telephone number from the transmitter side through the caller telephone number informing service, the receiver side searches telephone numbers registered in the memory in a single button dialing and an abbreviated dialing to check whether or not there is there is a corresponding telephone number.

In ST1804 to ST1806, short previous-procedure communication is carried out when there is the corresponding telephone number, and normal protocol communication carried out when there is no corresponding telephone number.

In the embodiment, either the transmitting-apparatus or the receiving apparatus registers information such as the modem parameter, the optimal training time and the modulation mode in the memory. But, the transmitting apparatus and the receiving apparatus may both register those information in the memories. This allows the transmitting apparatus and the receiving apparatus to skip the communication protocol 19a of FIG. 19 and start from the communication protocol 19b upon reception of an incoming signal. In this case, the time for the pre-communication protocol is further shortened because such information need not be exchanged in the communication protocol.

According to this invention, as discussed above, a modem parameter and optimal training time for a modem are stored in association with a destination's telephone number, so that in the subsequent communication, the communication pre-protocol can be performed in accordance with the stored modem parameter and optimal training time. It is therefore possible to largely shorten the time for the pre-communication protocol.

Moreover, when a communication error rate high or there is a change in line characteristics, an update of a parameter can be suitably executed and an execution of a short previous-procedure can be prohibited, so that the short previous-procedure can be executed in an appropriate state while avoiding a case in which communication time increases due to the presence of short previous-procedure functions.

What is claimed is:

1. A data communication apparatus comprising:
   a memory that stores destination information and modem control information in association with each other; and
   a calling section that performs a communication by sequentially transmitting a calling signal to a destination, transmitting a shift notification signal that indicates a shift to a short previous-procedure when the destination to which the communication is performed corresponds to the destination information stored in said memory, and controlling a modem based on the stored modem control information so as to shorten a previous-procedure, wherein said calling section transmits the shift notification signal in place of a calling menu signal.

2. The data communication apparatus according to claim 1, wherein said calling section transmits the shift notification signal after a deformed answer signal from a receiver side is received.

3. The data communication apparatus according to claim 1, further comprising a operation panel that includes a plurality of keys;

wherein the destination information is stored into said memory in association with operation of the plurality of said operation panel.

4. The data communication apparatus according to claim 1, wherein the calling signal is configured to conform to Recommendation ITU/V.34, dated September 1994.

5. The data communication apparatus according to claim 1, wherein the calling signal is configured to conform to Recommendation ITU/V.30 Annex F, dated June 1996.

6. A data communication method using a data communication apparatus, provided with a memory that stores destination information and modem control information in association with each other, the data communication method comprising:

performing a communication including transmitting a calling signal to a destination;

transmitting a shift notification signal that indicates a shift to a short previous-procedure when the destination to which the communication is performed corresponds to the stored destination information; and controlling a modem based on the stored modem control information so as to shorten a previous-procedure, wherein transmitting the shift notification signal is performed instead of transmitting a calling menu signal.

7. The data communication method according to claim 6, wherein transmitting the shift notification signal is performed after a deformed answer signal from a receiver side is received.

8. The data communication method according to claim 6, wherein the data communication apparatus includes an operation panel that includes a plurality of keys, the method further comprising:

storing the destination information into the memory in association with operation of the plurality of keys of the operation panel.

* * * * *

UNITED STATES PATENT AND TRADEMARK OFFICE
CERTIFICATE OF CORRECTION

PATENT NO. : 6,606,375 B2
DATED : August 12, 2003
INVENTOR(S) : Takafumi Higuchi It is certified that error appears in the above-identified patent and that said Letters Patent is hereby corrected as shown below:

<u>Column 25,</u>
Line 18, after "of" insert -- keys of --.
Line 25, "ITU/V.30" should be -- ITU/T.30 --.

Signed and Sealed this

Second Day of March, 2004

JON W. DUDAS
*Acting Director of the United States Patent and Trademark Office*